(12) United States Patent
Mi et al.

(10) Patent No.: US 12,182,132 B2
(45) Date of Patent: Dec. 31, 2024

(54) SYSTEM AND METHOD OF GENERATING DATA FOR POPULATING OR UPDATING ACCOUNTING DATABASES BASED ON DIGITIZED ACCOUNTING SOURCE DOCUMENTS

(71) Applicant: MSCPW Corporation, Mississauga (CA)

(72) Inventors: Yang Mi, Mississauga (CA); Ling Sun, Mississauga (CA)

(73) Assignee: MSCPW Corporation, Guelph (CA)

( * ) Notice: Subject to any disclaimer, the term of this patent is extended or adjusted under 35 U.S.C. 154(b) by 0 days.

(21) Appl. No.: 18/271,733

(22) PCT Filed: Dec. 21, 2021

(86) PCT No.: PCT/CA2021/051861
§ 371 (c)(1),
(2) Date: Jul. 11, 2023

(87) PCT Pub. No.: WO2022/160031
PCT Pub. Date: Aug. 4, 2022

(65) Prior Publication Data
US 2024/0078239 A1 Mar. 7, 2024

(30) Foreign Application Priority Data
Jan. 27, 2021 (CA) ...................................... 3107324

(51) Int. Cl.
*G06F 16/2457* (2019.01)
*G06F 16/28* (2019.01)
(52) U.S. Cl.
CPC ...... *G06F 16/24575* (2019.01); *G06F 16/288* (2019.01)
(58) Field of Classification Search
CPC ..................... G06F 16/24575; G06F 16/288
See application file for complete search history.

(56) References Cited

U.S. PATENT DOCUMENTS 6,704,450 B2   3/2004   Naoi et al.
7,487,446 B2   2/2009   Hargarten et al.
(Continued)

FOREIGN PATENT DOCUMENTS

CN   109636557 A   4/2019
CN   109886794 A   6/2019

OTHER PUBLICATIONS

International Search Report and Written Opinion dated Feb. 21, 2022 issued in International Application No. PCT/CA2021/051861, 2022 (15 pages).

(Continued)

*Primary Examiner* — Huawen A Peng

(57) ABSTRACT

To generate data for populating/updating accounting databases based on digitized accounting source documents, access to an entity database comprising identifiers of entities associated with an accounting database and to a digital template library comprising processing templates for processing digitized accounting source documents is provided. Each entity in the entity database is associated with one processing template. A processor receives digitized data representing a digitized accounting source document; determines if the digitized data comprises an entity identifier that matches a particular identifier of a particular entity in the entity database; and in response to determining that the entity identifier matches the particular identifier of the particular entity in the entity database, retrieves from the template library a particular processing template associated with the particular entity; and processes the digitized data to generate processed data, according to the particular processing template, for populating/updating the accounting database.

19 Claims, 25 Drawing Sheets

(56) References Cited

U.S. PATENT DOCUMENTS

| | | | |
|---|---|---|---|
| 7,761,591 B2 * | 7/2010 | Graham | G06Q 40/02 |
| | | | 709/227 |
| 8,032,829 B2 | 10/2011 | Hargarten et al. | |
| 8,049,921 B2 | 11/2011 | Gangai | |
| 8,233,751 B2 | 7/2012 | Patel et al. | |
| 8,345,981 B2 | 1/2013 | Schmidtler et al. | |
| 8,442,881 B2 | 5/2013 | Patel | |
| 8,526,739 B2 | 9/2013 | Schmidtler et al. | |
| 8,707,168 B2 | 4/2014 | Hargarten et al. | |
| 8,774,516 B2 | 7/2014 | Amtrup et al. | |
| 8,855,375 B2 | 10/2014 | Macciola et al. | |
| 8,855,425 B2 | 10/2014 | Schmidtler et al. | |
| 8,874,504 B2 | 10/2014 | King et al. | |
| 8,879,846 B2 | 11/2014 | Amtrup et al. | |
| 8,958,605 B2 | 2/2015 | Amtrup et al. | |
| 9,058,580 B1 | 6/2015 | Amtrup et al. | |
| 9,483,794 B2 | 11/2016 | Amtrup et al. | |
| 9,542,380 B2 | 1/2017 | Hargarten et al. | |
| 9,576,272 B2 | 2/2017 | Macciola et al. | |
| 10,387,559 B1 | 8/2019 | Wendt et al. | |
| 10,410,191 B2 | 9/2019 | Ceribelli et al. | |
| 10,467,464 B2 | 11/2019 | Chen et al. | |
| 10,515,407 B2 | 12/2019 | Amtrup et al. | |
| 10,726,200 B2 | 7/2020 | Chou | |
| 11,880,377 B1 * | 1/2024 | Tsang | G06Q 30/00 |
| 2004/0230508 A1 | 11/2004 | Minnis et al. | |
| 2006/0026086 A1 * | 2/2006 | Jim | G06Q 20/207 |
| | | | 705/326 |
| 2007/0005461 A1 * | 1/2007 | Lenz | G06Q 40/00 |
| | | | 705/31 |
| 2008/0249902 A1 | 10/2008 | Lehman et al. | |
| 2009/0037305 A1 * | 2/2009 | Sander | G06Q 40/123 |
| | | | 235/379 |
| 2010/0228996 A1 | 9/2010 | Ginter et al. | |
| 2013/0185178 A1 * | 7/2013 | Greef | G06F 40/14 |
| | | | 705/30 |
| 2013/0232043 A1 | 9/2013 | Patel | |
| 2014/0006234 A1 * | 1/2014 | Geisau | G06Q 30/0641 |
| | | | 705/30 |
| 2014/0153787 A1 | 6/2014 | Schmidtler et al. | |
| 2014/0207631 A1 | 7/2014 | Fisher | |
| 2016/0078557 A1 * | 3/2016 | Kumar | G06F 16/245 |
| | | | 705/30 |

OTHER PUBLICATIONS

Examiner's Report dated Jun. 6, 2023 issued in Canadian Patent Application No. 3107324 (4 pages).

* cited by examiner

102

| ABC Inc | | | | | | | | INVOICE | |
|---|---|---|---|---|---|---|---|---|---|
| 15 Abc Ave, | | | | | | | | | |
| A City, ON | | | | | | | | | |
| | | | | | | | | | |
| Invoice #: | A123 | | | Customer Name: | | | | WAD | |
| | | | | | | | | | |
| Invoice Date: | 7/15/2019 | | | Account #: | | | | 4007854126 | |
| | | | | | | | | | |
| Term: | 1/10, N30 | | | Contact Info: | | | | 905-177-0000 | |
| | | | | | | | | | |
| GST/HST #: | 963852741 RT 0001 | | | | | | | | |
| | | | | | | | | | |
| Shipping: | | | | Billing: | | | | | |
| Account #: | 4007854126 | | | Account #: | | | | 4007854126 | |
| WAD | | | | WAD | | | | | |
| 10 Meg Rd, | | | | 10 Meg Rd, | | | | | |
| M City, ON | | | | M City, ON | | | | | |
| | | | | | | | | | |
| Product Number | Description | Unit | Quantity | Unit Price | | | | Amount | |
| | | | | | | | | | |
| T102011 | Computer Desk - White | Each | 1 | 750.00 | | | | 750.00 | |
| | | | | | | | | | |
| C101517 | Chair - White | Each | 2 | 410.00 | | | | 820.00 | |
| | | | | | | | | &@#$ | |
| P1075 | Pencil 6/pack - Blue | Each | 5 | 4.27 | | | | 21.35 | |
| | | | | | | | | | |
| Please review the invoice carefully! | | | | | | | | | |
| | | | | Subtotal: | | | | 1,591.35 | |
| | | | | Shipping: | | | | | 20.00 |
| | | | | Shipping Discount: -20 | | | | | |
| | | | | HST 13%: | | | | 206.88 | |
| | | | | Total: | | | | 1,798.23 | |

DOLLARAMA

| |
|---|
| 101 Clair Road East Unit IB |
| Guelph ON N1L 0J7 |
| (519)767-9037 |
| HST 863624433 |
| |
| VALENTINE-9 LARG 667888063536 1.25 H |
| VALENTINE-9 LARG 667888063536 1.25 H |
| VALENTINE-9 LARG 667888063536 1.25 H |
| VAL. CARDS       073168519615 1.25 H |
| VAL. CARDS       073168519615 1.25 H |
| SUBTOTAL                  $6.25 |
| HST 13%                   $0.81 |
| TOTAL.         $7.06 |
| MASTERCARD     $7.06 |
| |
| TYPE: PURCHASE |
| ACCT: MASTERCARD |
| |
| AMOUNT:    $    7.06 |
| |
| CARD NUMBER:    ************2547 |
| |
| DATE/TIME:    20/01/17    16:10:29 |
| |
| REFERENCE #:    66260833    0010014740    C |
| |
| AUTHOR. #:    009059 |
| |
| WALMART MC |
| A0000000041010 |
| 0000008000 E800 |
| |
| 01/027 APPROVED - THANK YOU |
| |
| - IMPORTANT - |
| |
| Retain This Copy For Your Records |
| *** CUSTOMER COPY *** |
| |
| PRICES MAY INCLUDE ECO FEES |
| (WHEN APPLICABLE) |
| |
| NO EXCHANGE |
| NO RETURN |
| |
| THANK YOU FOR SHOPPING AT DOLLARAMA |
| 2020-01-17 16:10:35 |
| |
| 000810 01 275592    8907 |
| |
| WWW.DOLLARAMA.COM |

FIG. 3

| PRIORITY | ENTITY ID | ENTITY NAME | TAX NUM | URL | PHONE NUM_1 | PHONE NUM_2 | PHONE NUM_3 | TEMPLATE ID |
|---|---|---|---|---|---|---|---|---|
| 1 | 1001 | ABC Inc | 963852741RT0001 | abc.com | 416-000-0001 | 417-000-0001 | 418-000-0001 | 9001 |
| 1 | 1002 | Dollarama | 863624433RT0001 | dollarama.com | 4160010002 | 4170010002 | 4180010002 | 9002 |
| 2 | 1003 | Costco Inc. | 823902743RT0001 | costco.ca | 416.002.0002 | 417.002.0002 | 418.002.0002 | 9003 |
| 3 | 1004 | Staples Corp. | 938490278RT0001 | staples.ca | 416-003-0003 | 417-003-0003 | 418-003-0003 | 9004 |
| 4 | 1005 | Sysco Foods Inc. | 923082723RT0001 | sysco.ca | 416-004-0004 | 417-004-0004 | 418-004-0004 | 9005 |

FIG. 5

| TEMPLATE ID | TEMPLATE_TYPE | ENTITY ID |
|---|---|---|
| 9001 | 1 | 1001 |
| 9002 | 2 | 1002 |
| 9003 | 3 | 1003 |
| 9004 | 1 | 1004 |
| 9005 | 4 | 1005 |

FIG. 4

General Operating Expense and Other Asset Purchase Template

Please enter at least first 3 letters of alias if needed.

| | Alias of Keyword | Location of the value | | | Alias of Keyword | Location of the value | |
|---|---|---|---|---|---|---|---|
| *Invoice Number | | | Choose/Review | Payment Term | | | Choose/Review |
| *Invoice Date | | | Choose/Review | *Date format start with | | Month | Choose/Review |
| *Description and pretax amount are in same row? | | Y | | | | | |
| Description | | | Choose/Review | Vendor item number | | | Choose/Review |
| Unit of measure | | row +1, column +0 | Choose/Review | Unit price | | row +1, column +0 | Choose/Review |
| Quantity | | row +1, column +0 | Choose/Review | *Pretax amount | | row +1, column +0 | Choose/Review |
| *Subtotal before tax | | | Choose/Review | Discount | | | Choose/Review |
| Tax amount 1 | | | Choose/Review | Tax amount 2 | | | Choose/Review |
| Freight | | | Choose/Review | Freight discount | | | Choose/Review |
| *Total | | | Choose/Review | | | | |

Cancel   Create

FIG. 10

Template ID 9001 ~218

General Operating Expense and Other Asset Purchase Template

Please enter at least first 3 letters of alias if needed.

| | Alias of Keyword | Location of the value | | | Alias of Keyword | Location of the value | |
|---|---|---|---|---|---|---|---|
| *Invoice Number | Invoice # | row +0, column +1 | Choose/Review | Payment Term | Term | row +0, column +1 | Choose/Review |
| *Invoice Date | | row +0, column +1 | Choose/Review | *Date format start with | Month | | |
| *Description and pretax amount are in same row? | | Y | | Vendor item number | Product Number | row +1, column +0 | Choose/Review |
| Description | | row +1, column +0 | Choose/Review | Unit price | | row +1, column +0 | Choose/Review |
| Unit of measure | Unit | row +1, column +0 | Choose/Review | *Pretax amount | Amount | row +1, column +0 | Choose/Review |
| Quantity | | row +1, column +0 | Choose/Review | Discount | | None | Choose/Review |
| *Subtotal before tax | Subtotal | row +1, column +1 | Choose/Review | Tax amount 2 | | None | Choose/Review |
| Tax amount 1 | HST 13% | row +0, column +2 | Choose/Review | Freight discount | Shipping Discount | Same cell – at the right of the keyword | Choose/Review |
| Freight | Shipping | row +0, column +1 | Choose/Review | | | | |
| *Total | | row +0, column +1 | Choose/Review | | | | |

Point of Sale (POS) Receipt Template

Please enter at least first 3 letters of alias if needed.

| | Explanation | Value |
|---|---|---|
| *Date format start with | Please choose day, month, year | ☐☐☐☐☐ |
| *Phrase above 1st line of products | At least 5 characters in order (including space) | |
| *Format of product number | Any dash ("-") between product numbers exits? | |
| *Location of product number | In the first part of each product line? | |
| *The least number of characters contained in the product number | Please choose at least number of characters | |
| Subtotal | Alias | ☐☐☐☐ 9020 |
| Tax amount 1 | Alias | |
| Tax amount 2 | Alias | |
| Total | Alias | |

9010

Cancel     Create

Template ID 9002 ~218

Point of Sale (POS) Receipt Template

Please enter at least first 3 letters of alias if needed.

| | Explanation | Value |
|---|---|---|
| *Date format start with | Please choose day, month, year | Year |
| *Phrase above 1st line of products | At least 5 characters in order (including space) | HST 86 |
| *Format of product number | Any dash ("-") between product numbers exits? | No |
| *Location of product number | In the first part of each product line? | No |
| *The least number of characters contained in the product number | Please choose at least number of characters | 12 |
| Subtotal | Alias | HST 13% |
| Tax amount 1 | Alias | |
| Tax amount 2 | Alias | |
| Total | Alias | |

Receive, at a processor, digitized data representing a digitized accounting source document Determine positions at which to subdivide the digitized data
S1302

Based on the determination, process the digitized data into individualized subdivisions
S1304

Parsing, by the processor, the digitized data to identify an entity indicator

Search the digitized data to locate a text string matching a keyword from a list of pre-defined keywords
S1402

Parse text or numerical strings located adjacent to the text string matching the keyword to identify the entity indicator
S1404

FIG. 13

| ENTRY NO | INVOICE# | VENDOR | DATE | ITEMS | SUBTOTAL | TAX_AMOUNT | TOTAL |
|---|---|---|---|---|---|---|---|
| 123 | A123 | ABC INC. | 7/15/2019 | 3 | 1591.35 | 206.88 | 1798.23 |

| INVENTORY ID | SKU | QUANTITY | UOM RATIO | UNIT PRICE |
|---|---|---|---|---|
| P001 | T102011 | 1 | 1 | 750 |
| P002 | C101517 | 2 | 1 | 410 |
| P003 | P1075 | 30 | 6 | 4.27 |

New

| *Vendor Name | Please enter company name | | Frequency | Frequent ⌄ | ⓘ |

*Address1 | Please enter address | *TaxID | | *Sale Tax ⌄

Address2 | | Email | | *Country ⌄

Web | ⓘ | *Province | | *City

Business ID | | Postal Code | | Fax | | Contact

Tel1 ⓘ | Tel2 ⓘ | Tel3 ⓘ | Tel4 ⓘ

FIG. 21

| Create/Import Template | | |
|---|---|---|
| Vendor Name | AEAE | 2202 |
| Create Template ⌄ | Inventory Purchase Template ⌄ | 2204 Submit ✕ |

Inventory Purchase Template
Please enter at least first 3 letters of alias if needed.

| | Alias of Keyword | Location of the value | | Alias of Keyword | Location of the value | |
|---|---|---|---|---|---|---|
| *Invoice Number | | | Choose/Review | Payment Term | | Choose/Review |
| *Invoice Date | | | Choose/Review | *Date format start with | Month | Choose/Review |
| *Description and pretax amount are in same row? | Y | | | | | |
| Description | | | Choose/Review | *Vendor item number | | Choose/Review |
| *Unit of measure | | row +1, column +0 | Choose/Review | Unit price | row +1, column +0 | Choose/Review |
| *Quantity | | row +1, column +0 | Choose/Review | *Pretax amount | row +1, column +0 | Choose/Review |
| *Subtotal before tax | | | Choose/Review | Discount | | Choose/Review |
| Tax amount 1 | | | Choose/Review | Tax amount 2 | | Choose/Review |
| Freight | | | Choose/Review | Freight discount | | Choose/Review |
| *Total | | | Choose/Review | | | |

9010  9020  9030

Cancel    Create

Choose Location

○ No such item
○ Same cell – at the left of the keyword or its alias
○ Same cell – at right of the keyword or its alias
● Other (in a different cell)

2400

2402 → [highlighted cell]

Invoice Number

OK
Cancel

FIG. 23

Inventory

2500 →

| Main × | • Inventory × | | | | | | | | |

| | > | Please enter content | | | Search | New | Export | Item # Mapping Table | Inactive Products |

2502

| ☐ | Item # | Description | Type | Inventory UOM | YTD Quantity | YTD Value | Min.Inventory Level | Status | Action |
|---|---|---|---|---|---|---|---|---|---|
| ☐ | INV001 | DESK-W | INVENTORY | EACH | 1 | 750.00 | 1 | Active | Edit Delete Detail |
| ☐ | INV002 | CHAIR-W | INVENTORY | EACH | 2 | 820.00 | | Active | Edit Delete Detail |
| ☐ | INV003 | PENCIL-UNIT | INVENTORY | UNIT | 30 | 21.35 | | Active | Edit Delete Detail |

New — 2600

Basic

*Type [Inventory ˅]   *Item # [_____]   Sales Tax [_____ ˅]

*Description [_____]   *Sales Account [˅]   *Asset Account [_____ ˅]

*Cost Account [_____ ˅]   *Variance Account [˅]   Active [YES ˅]

— 2602

Unit of Measure (UOM)

*UOM-Inventory [_____]   Sales Unit Price [0.0]

UOM-Purchase [_____]   Ratio [1]  ⊕ ⊖

UOM-Sales [_____]   Ratio [1]  ⊕ ⊖

SYSTEM AND METHOD OF GENERATING DATA FOR POPULATING OR UPDATING ACCOUNTING DATABASES BASED ON DIGITIZED ACCOUNTING SOURCE DOCUMENTS

CROSS-REFERENCE TO RELATED APPLICATIONS

This application is a U.S. National Phase Application under 35 U.S.C. § 371 of International Application No. PCT/CA2021/051861 filed Dec. 21, 2021, which claims the benefit of and priority to Canadian Patent Application No. CA 3107324, filed on Jan. 27, 2021, the entire contents of the prior applications are incorporated herein by reference in its entirety.

FIELD

This disclosure relates generally to systems and methods of generating accounting data for populating or updating an accounting database based on digitized accounting source documents, and particularly to systems and methods for automatically generating accounting data from digitized invoices or receipts or the like for recording in an accounting database.

BACKGROUND

Processing of accounting source documents, such as vendor invoices and point of sale (POS) receipts for accounting purposes can be time-consuming and labor intensive, particularly if the processing involves manually inputting data based on the invoices or receipts. Paper or hardcopy documents can be scanned and digitized, but automatic processing of the scanned documents or images of invoices and receipts presents some technical challenges. For example, one challenge is that the invoices or receipts a business may receive can have diverse formats and may contain very different information on each document. Further, as specific invoices may relate to different business operations, they may need to be assessed and processed differently.

Automating invoice data extraction and entry into an accounting system has proven difficult for a number of reasons. While techniques for automatic context parsing of digital documents have been proposed, they tend to require extensive computation resources. Further, such techniques are typically not optimized for processing documents specific to a business or a particular type of document, and may thus be inefficient.

The information contained on each digitized document may vary from document to document. For example, invoices typically include vendor name, invoice number, invoice date, payment term, due date, purchase order number, item number, item description, quantity, unit, unit price, pre-tax amount, pre-tax subtotal amount, tax rate and tax amount, and total amount. POS receipts typically include vendor name, receipt date and time, item number, item description, quantity, unit price, pre-tax amount, pre-tax subtotal amount, tax rate and tax amount, total amount, payment method, and payment amount.

Other challenges also exist for fully automatic invoice recording.

It is thus desirable to improve upon the current techniques for processing and recording digitized invoices and receipts or similar documents in an accounting system.

SUMMARY

Embodiments described herein include processes and systems for extracting accounting data from accounting source documents.

According to an aspect of the present disclosure, there is provided a computer-assisted method of generating data for populating or updating accounting databases based on digitized accounting source documents, the method comprising, at a processor: providing access to an entity database comprising identifiers of entities associated with an accounting database; providing access to a digital template library comprising a plurality of processing templates for processing digitized accounting source documents, wherein each one of the entities in the entity database is associated with one of the processing templates; receiving digitized data representing a digitized accounting source document; determining if the digitized data comprises an entity identifier that matches a particular identifier of a particular entity in the entity database; and in response to determining that the entity identifier matches the particular identifier of the particular entity in the entity database, retrieving from the template library a particular processing template associated with the particular entity; and processing the digitized data to generate processed data, according to the particular processing template, for populating or updating the accounting database based on the processed data.

According to some embodiments, the identifiers of entities in the entity database comprise numerical identifiers associated with respective entities.

According to some embodiments, the numerical identifiers comprise tax or business numbers assigned to the respective entities, or phone numbers of the respective entities.

According to some embodiments, the identifiers of entities in the entity database comprise text strings.

According to some embodiments, the text strings comprise names of respective entities.

According to some embodiments, the text strings comprise uniform resource locators of respective entities.

According to some embodiments, the determining comprises: parsing the digitized data to locate a text string matching a keyword from a list of pre-defined keywords; and parsing text or numerical strings located adjacent to the text string matching the keyword to identify the entity identifier.

According to some embodiments, the list of predefined keywords comprises one or more of keywords indicative of a business type, a root domain, or a symbol for a tax or business number.

According to some embodiments, the entity database comprises a plurality of records, each one of the records being associated with one of the entities associated with the accounting database and comprising data indicative of at least one of a business name, a tax or business number, a uniform resource locator, and a phone number.

According to some embodiments, the determining comprises: (a) parsing the digitized data to identify a tax number as the entity identifier; (b) parsing the digitized data to identify a business name as the entity identifier; (c) parsing the digitized data to identify a uniform resource locator as the entity identifier; or (d) selecting a record from the entity database, (i) searching the digitized data for presence of a phone number matching a phone number from the selected record, and (ii) if a matching phone number is present in the digitized data, identifying the entity associated with the selected record as the particular entity, otherwise iteratively selecting another record from the entity database and repeating (i) and (ii).

According to some embodiments, the searching comprises: searching the digitized data for presence of a string matching a phone number string in the selected record.

According to some embodiments, the phone number string has a predefined pattern, and the searching comprises string-matching the predefined pattern within the digitized data.

According to some embodiments, the records in the entity database are assigned different priorities and are selected in (d) in order of the priorities.

According to some embodiments, (a), (b), (c), and (d) are performed in order until the entity identifier has been identified.

According to some embodiments, the particular processing template comprises format and content information indicative of a format and possible content in original accounting source documents issued by the particular entity.

According to some embodiments, the particular processing template defines an alias for a standard keyword, and the processing comprises parsing the digitized data to locate the alias in the digitized accounting source document.

According to some embodiments, the particular processing template comprises relative location information for locating data information associated with a specific keyword or an alias thereof, and the processing comprises locating the data information associated with the specific keyword or the alias thereof in the digitized accounting source document based on the location of the specific keyword or the alias thereof and the relative location information.

According to some embodiments, the digitized accounting source document lists one or more lines of product, each line of product comprising a product identifier and an associated cost, the particular processing template comprises a specific phrase for locating the first line in the one or more lines of product, and the processing comprises: parsing the digitized data to locate the line containing the specific phrase in the digitized accounting source document, locating, based on the location of the line containing the specific phrase, the first line, and parsing, line-by-line, starting from the first line, the one or more lines of product to obtain the product identifier and associated cost in each line of product.

According to some embodiments, the particular processing template is generated based on a base template, the base template defining a plurality of fields to be populated in the accounting database.

According to some embodiments, the particular processing template is modified from the base template based on user input.

According to some embodiments, the particular processing template is generated based on another processing template and modified based on user input.

According to some embodiments, the plurality of fields comprise mandatory fields, and the method further comprising automatically verifying values in the processed data for completeness and accuracy, based on an internal relationship among the digitized data, or based on one or more pre-defined verification rules.

According to some embodiments, the accounting database comprises an inventory database and a non-inventory database, and the template library comprises a first set of processing templates for processing an inventory type of digitized accounting source documents and a second set of processing templates for processing a non-inventory type of digitized accounting source documents.

According to some embodiments, each one of the first set of processing templates comprises information for identifying an inventory item and a unit of measure of the inventory item in the digitized data and instruction for determining a quantity of units of the inventory item indicated in the digitized accounting source document.

According to some embodiments, the digitized data is generated from a digitized document, wherein the digitized document comprises a plurality of ordered data structures representing multiple original accounting source documents, each original accounting source document represented by a pre-defined number of adjacent data structures in the ordered data structures, wherein generation of the digitized data comprises merging the pre-defined number of adjacent data structures in the digitized document to produce a single data structure representing the each original accounting source document.

According to some embodiments, the digitized document is a tabulated document, and the ordered data structures are tabs in the tabulated document, each one of the tabs representing a single page in one of the multiple original accounting source documents.

According to some embodiments, the digitized document has a document name and the pre-defined number is based on an upload parameter.

According to some embodiments, the single data structure is stored as a single tab in a saved tabulated document, or as a separate single document.

According to some embodiments, the method comprises populating or updating the accounting database using the processed data.

In another aspect of the present disclosure, there is provided a computer system comprising: a processor; and a processor-readable medium storing thereon processor executable instructions that when executed by the processor adapt the processor to perform the methods described herein, the accounting database, the entity database, and the template library.

According to some embodiments, the processor comprises one or more processors at a server, at least one of the one or more processors in communication with a client computer through a network.

According to some embodiments, the system comprises a display for presenting a graphical user interface.

According to some embodiments, the processor-readable medium comprises a plurality of processor-readable media.

In another aspect of the present disclosure, there is provided a computer readable medium storing thereon processor executable instructions that when executed by a processor perform the methods described herein.

BRIEF DESCRIPTION OF DRAWINGS

In the Figures, which illustrate example embodiments,

FIG. 2 is a table illustrating an example digitized invoice;

FIG. 3 is another table illustrating an example digitized POS receipt;

FIG. 4 is a table illustrating an example template library used by the data processor;

FIG. 5 is a table illustrating an example entity database used by the data processor;

FIGS. 10 and 10A are screenshots of an example graphic user interface for generating or updating a processing template stored in the template library;

FIGS. 11 and 11A are screenshots of another graphic user interface for generating or updating another example processing template stored in the template library;

FIG. 12 is a flowchart illustrating a method of receiving digitized data representing a digitized accounting source document;

FIG. 13 is a flowchart illustrating a method of parsing digitized data for an entity identifier;

FIG. 16 is a table illustrating an example accounting database used by the data processor;

FIG. 18 is a table illustrating an example inventory database used by the data processor;

FIG. 20 is a screenshot of an example graphic user interface for managing an entity database;

FIG. 21 is a screenshot of an example graphic user interface for entering new values into an entity database;

FIG. 22 is a screenshot of an example graphic user interface for entering new values into a template library;

FIG. 23 is a screenshot of an example graphic user interface for determining a relative location for a template;

FIG. 24 is a screenshot of an example graphic user interface for managing an inventory database; and FIG. 25 is a screenshot of an example graphic user interface for entering new values into an inventory database.

DETAILED DESCRIPTION

Figure 1:
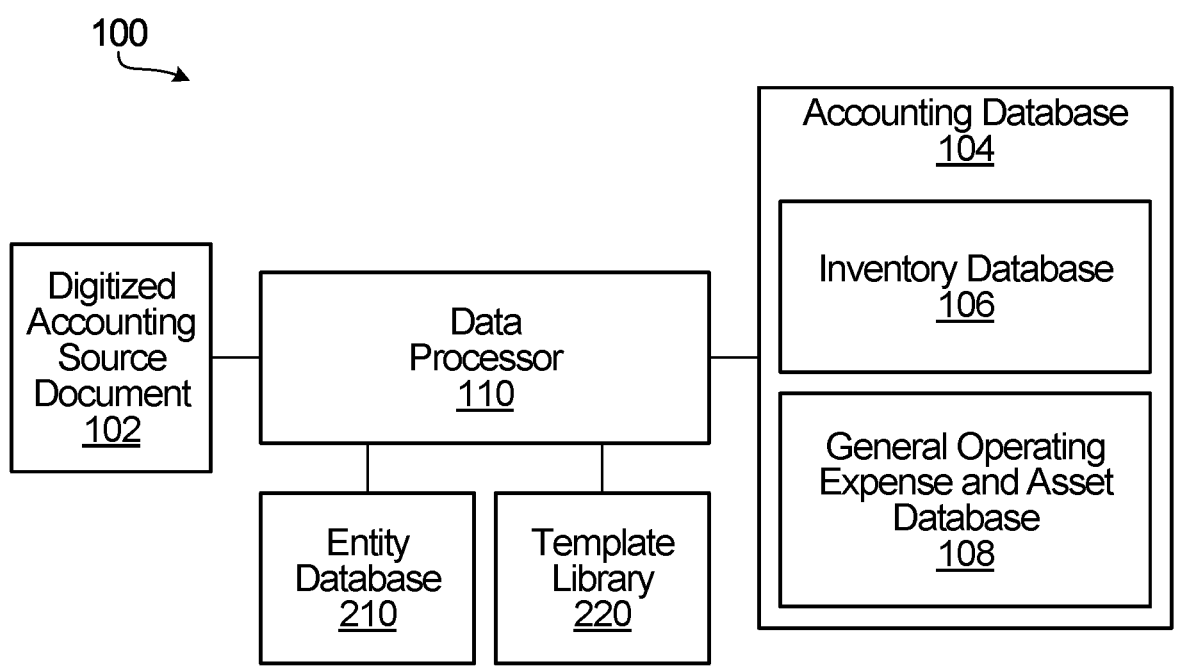
FIG. 1 is a block diagram illustrating a computer system comprising a data processor.

In brief overview, it has been recognized by the present inventors that an improved method and system for processing and recording digitized invoices or receipts or other digitized accounting source documents should be able to address or overcome one or more of the following challenges:

properly and efficiently extracting data from digitized documents with format variations, such as variations in data format or physical format, variations in document length or page numbers efficiently identifying vendor names associated with each source document automatically identifying certain specific accounting information that requires different processing techniques, such as those for inventory items or non-inventory items automatic conversion of unit of measure (UOM) of inventory items automatic verification of accuracy and completeness of accounting data, based on the requirements for a specific entity or user utilizing an internal relation and logical relation in different accounting items or data to provide more efficient processing or to simplify data identification and processing.

Embodiments disclosed herein include systems and methods for meeting one or more of the above challenges.

For example, in an embodiment, a specific processing template is associated with the processing procedure for each digitized accounting source document. A particular processing template associated with a particular entity would include format and content information indicative of a format and possible content in the original accounting source documents issued by the particular entity, for facilitating processing of the digitized source documents representing the original source documents. The specific processing template may be customized to the accounting source document and the entity. For example, the customizations may dictate how a computer system may understand the specific format presented for the accounting source document. Format comprehension for the accounting source document may relate to the titles and keywords used within an accounting source document, or the numeric data format. Accordingly, use of a specific processing template customized for a particular entity allows the system to properly and efficiently extract data. Further, the specific processing template may dictate the format of specific accounting information that may require a different processing technique (such as those for inventory or non-inventory items) based on business needs. The specific processing template may include internal relationships that may be used for data accuracy assessment.

As another example, in an embodiment, a multi-tiered entity-identification method is used to identify the template associated with an accounting source document. Using specific types of entity identifiers or keywords relating to a business name, tax number, URL, phone number, etc., the vendor name associated with each document may be identified. A business name can include a suffix indicating a business type (Inc., Corp., Ltd., etc.). Use of a tiered approach provides greater certainty if the accounting source document format may change over time.

As another example, in an embodiment, an inventory database of the accounting database may be modified based on the results of processing according to the specific processing template. The inventory database may be modified according to a unit of measure ratio used in the processing.

Embodiments described herein include processes and systems for extracting accounting data from accounting source documents.

According to one aspect, there is provided a computer-assisted method of generating data for populating or updating accounting databases based on digitized accounting source documents. The method comprises, at a processor, (1) providing access to an entity database comprising identifiers of entities associated with an accounting database, (2) providing access to a digital template library comprising a plurality of processing templates for processing digitized accounting source documents, wherein each one of the entities in the entity database is associated with one of the processing templates, (3) receiving digitized data representing a digitized accounting source document, (4) determining if the digitized data comprises an entity identifier that matches a particular identifier of a particular entity in the entity database, (5) and in response to determining that the entity identifier matches the particular identifier of the particular entity in the entity database, retrieving from the template library a particular processing template associated with the particular entity, (6) and processing the digitized data to generate processed data, according to the particular processing template, for populating or updating the accounting database based on the processed data.

In another aspect, there is provided a computer system comprising: a processor, and a processor-readable medium storing thereon processor executable instructions that when executed by the processor adapt the processor to (1) provide access to an entity database comprising identifiers of entities associated with an accounting database, (2) provide access to a digital template library comprising a plurality of processing templates for processing digitized accounting source documents, wherein each one of the entities in the entity database is associated with one of the processing templates, (3) receive digitized data representing a digitized accounting source document, (4) determine if the digitized data comprises an entity identifier that matches a particular identifier of a particular entity in the entity database, (5) and in response to determining that the entity identifier matches the particular identifier of the particular entity in the entity database, retrieve from the template library a particular processing template associated with the particular entity, (6) and process the digitized data to generate processed data, according to the particular processing template, for populating or updating the accounting database based on the processed data.

FIG. 1 shows a computer system 100 for processing and recording accounting data based on digitized accounting source documents. System 100 includes a data processor 110 for importing data from a digitized accounting source document 102 and parsing the imported data for entry into an accounting database, such as accounting database 104. The accounting database 104 may comprise an inventory database 106, and general operating expense and asset database 108.

Data processor 110 receives, as input, digitized data in the form of a digitized accounting source document 102. Data processor 110 is in communication with and can access an entity database 210 and a template library 220. Data processor 110 is also in communication with, and can modify, accounting database 104, comprising inventory database 106, and general operating expense and asset database 108. Data processor 110 is configured to analyze the digitized accounting source document 102 and extract data therefrom and then modify the accounting database 104 based on data extracted from digitized accounting source document 102. Data processor 110 may output new data to be included in accounting database 104, or may output instructions for modification to pre-existing entries within accounting database 104.

Digitized accounting source documents 102 may be represented by digitized data obtained from digitized scanned copies of, and representative of, accounting source documents, for example invoices and POS receipts. Other examples of accounting source documents include purchase orders, bills, statements, checks, or another document for record of a transaction. Digitized accounting source documents 102 may be provided to data processor 110 in a suitable image format such as BMP, PNG, JPEG, TIFF, etc. Alternatively, a portable document file (PDF), such as a searchable PDF or non-searchable PDF etc. may be used. By using optical character recognition (OCR), the digitized accounting source document 102 may be converted to an electronic tabulated file. According to some embodiments, the data processor 110 may receive the input as an electronic tabulated document. According to other embodiments, the data processor 110 may generate, based on the digitized accounting source document 102, a tabulated document to be used by data processor 110 for analysis. According to other embodiments, the data processor 110 may generate, based on the digitized accounting source document 102, tabulated documents which may have one tab to be used by data processor 110 for analysis.

Digitized accounting source document 102 may be digitized data provided in the form of a number of digitized documents, such as electronic files, with variation in the total number of pages for each document, and the documents may have different original formats and physical sizes and layouts.

FIG. 2 shows an image of an example digitized accounting source document in the form of an invoice. As an illustrative example, the invoice is issued by ABC Inc., which is the vendor, for selling of three products. The total amount for three products is shown as $1,798.23. As can be seen, the invoice is processed to be in a tabulated format. Accordingly, each element of data shown on the tabulated invoice may be identified using its cell location information using either its row and column numbers, or Cartesian coordinate system using (x, y) notation, where x is assumed to be the row number and y is assumed to be the column number for the purpose of illustration herein. An element of data may also be identifiable using relative location information to another known cell location information. For example, the cell that is the immediate right-hand side neighbour of the cell with location information (x, y) may be identifiable as the cell with relative location information (x, y+1). Each cell may include cell information having a value. The value may be text or numerical. For example, as shown in FIG. 2, the cell at the leftmost column and sixth row containing the cell information "Invoice #:" may be addressed with location information of (6, 1). Another form of cell location information notation includes using a first location and a modifier that includes a relative value. For example, a cell located at the same row and the immediate next column to the right of the cell of "Invoice #:" (i.e. the cell containing the information of the invoice number "A123") may be referred to as the cell having relative location information of "row+0, column+1" with the understanding that the "row" and "column" being the row and column numbers of the reference cell respectively, i.e., row=6 and column=1. The location information of the cell for information "A123" is thus (6, 2). The modifier may be a string or numerical value indicative of a relative distance from the first location information to the second location information. The example string "row+0, column+1" may indicate that for any original value, a zero increment is added to the row value and one column of increment is added to the column value. In the examples given herein, the "+" and "−" signs indicate the direction of movement. The plus sign "+" indicates that the direction of movement is to the right (for column) or down (for row), and the negative sign "−" indicates movement to the left (for column) or up (for row). In different embodiments, the relative location information may be indicated in other suitable manners.

Some elements of interest in digitized accounting source document 102 may be identified in the digitized data with a title (i.e. specific phrase) or the common name used in a conventional accounting system. For example, the example invoice includes a title field for "Invoice #" having a value in the right-hand neighbouring cell location "A123". Some elements of interest however do not include such a title. For example, while it may be evident that the invoice is issued by "ABC Inc.", there is no title field in the example digitized invoice to identify an issuing entity or the vendor name. Sometimes, a title field and its associated value may be within the same cell. It is common in many invoices or receipts that the vendor name will appear without any indication that the text or logo is the vendor name.

FIG. 2 further displays three products sold. Each product includes a product number, description, unit, quantity, unit price, and amount. The amounts for each product may be summed to a subtotal; a shipping fee or discounts may be applied; and all may be summed to a total. Additional information may appear on a digitized invoice, based on the structure of the accounting source document as originally generated by an issuing entity.

FIG. 3 shows another example, a digitized POS receipt. The digitized receipt is similarly tabulated. A digitized POS receipt, according to some embodiments, typically has product information line by line in a certain format, such as the cost/price shown in the right side of the product line. Similar to the digitized invoice of FIG. 2, the locations of cells may be identified by a row and column. Alternatively, POS receipts may only require a row or line number for cells. The POS receipt of FIG. 3 includes the name of the vendor ("Dollarama"), its address, telephone number, tax (HST) number, and an URL ("www.dollarama.com") of the vendor. As in a typical POS receipt, it also includes the date and time of sale or purchase and one or more lines of sold or purchased items or articles (referred to as "product" or "products" herein). Each line of product may include one or more product identifiers, such as product name, product identification number, brand/model number, parts number, order number, or the like. Each line of product also contains a price, and may optionally include a unit price and number of units sold. As illustrated in FIG. 3, the product lines have a description (i.e. "VALENTINE-9" or "Val. CARDS"), a product number (i.e. "667888063536" or "073168519615") and an associated price (i.e. "1.25"). The associated price may include a symbol to indicate that tax will be applied to the specific product (i.e. the letter "H" to indicate HST). The POS receipt may also contain the total price, e.g. shown as the "Subtotal" (i.e. "$6.25") in FIG. 3. The receipt may also show any tax applied. For example, in the illustrated example in FIG. 3, "HST 13%" and "$0.81" indicate that the applied HST at 13% on the subtotal is $0.81. The receipt also shows the total cost as illustrated by the "TOTAL. $7.06" in FIG. 3. The receipt may contain other relevant accounting information such as information related to payment methods (e.g. by cash or credit card, and credit card information), type of transaction (e.g. purchase), internal reference numbers or tracking numbers. The receipt may further include information not relevant to accounting.

Returning to FIG. 1, data processor 110 accesses template library 220 and entity database 210 to extract data according to a specific processing template for an entity associated with digitized accounting source document 102. The data processor 110, based on the extraction, may modify accounting database 104.

FIG. 4 shows a table representation of an index of example entries in an example template library 220. Each processing template in the template library 220 has a template ID 218, a template type 222, and an entity ID 214. The template ID 218 may be used as an identifier to access a specific memory location storing the particular processing template associated with the template ID for processing the digitized accounting source document 102.

A processing template is a collection of specific format and content information and possibly other information that is useful for automated processing of a specific type of digitized accounting source documents, such as source documents from or issued by a specific entity. Each entity may be associated with a specific processing template. If an entity issues different types of accounting source documents, the entity may be associated with different processing templates. A processing template may be presented and stored in various suitable formats or data structures. For example, a processing template may include one or more file records stored at one or more locations. A processing template may include data stored in a pre-defined data structure used for locating and extracting data information in an accounting source document. For example, the data information associated with the Total in FIG. 2 is "1798.23". The processing template comprises format and content information indicative of a format and possible content in original accounting source documents issued by the particular entity. Content information may be indicative of a standard keyword or its alias for locating the data information. Example format information may include one or more of position or location information for a keyword or its alias, relative position or location information for data information associated with a keyword or its alias, the type (i.e. numerical or string) of the data information, and a pattern the data information may follow (i.e. if a date is presented in the order of day-month-year or month-day-year).

Processing templates may also contain features which may be used to generate instructions for a computer to process the associated accounting source documents, such as locate data from the associated accounting source documents by locating a standard keyword or its alias, locating data information associated with the standard keyword or its alias based on the relative locations of the standard keyword or its alias and the data information, or locating the first line or the last line of selected data information line(s).

According to some embodiments, processing templates may be stored as records in one or more databases. A processing template can be stored in one record or multiple records in a database or stored in multiple databases. The database or databases for storing the processing templates may be any suitable database known to those skilled in the art. The database may be configured for use with a selected database management system (DBMS) to provide improved performance, such as improved searching or storage efficiency. Example suitable DBMS may include Oracle™ Database, FoxPro™, MySQL™, Sybase™, dBASE™, or the like. The processing templates can be stored in a template library 220, and may be divided into groups or sub-libraries based on their respective specific uses.

The unique entity ID 214 of processing template is associated with a particular entity in entity database 210. As illustrated in FIG. 5, the entity record for the particular entity in the entity database 210 may also include the same entity ID 214 and template ID 218. The template associated with each template ID 218 in template library 220 may be customized to process the accounting source documents issued by the particular entity associated with the particular template ID or template. Templates of two or more specific entities may be created or modified with the same processing template when the accounting source documents they issued have common types of data and format. The templates may also be configured for processing different types of accounting source documents, and the templates in the template library 220 may be categorized accordingly. For example, templates for invoices can be based on a plurality of base templates, such as General Operating Expense and Asset Purchase Templates, POS Receipt Templates, Other Expense Templates, Inventory Purchase Templates, etc. A processing template may include processing information for required accounting data keywords, their aliases, and the locations of their corresponding values. The types of the processing templates may be indicated by their assigned template type 222.

For example, a specific template type 222 may be a base template type as described above, or defined by a user, and may dictate the necessary extraction requirements for the digitized accounting source document 102. For example, if an invoice relates to an inventory transaction, the template will include fields relating to inventory management. Each template type 222 may define mandatory fields and optional fields for data extraction.

FIG. 5 is a table representation of an index of example records in an example entity database 210. Each entity 211, uniquely identified by its entity ID 214 in the entity database 210, may be associated with a processing template identified by its template ID 218 in template library 220. Entity database 210 may be accessed by data processor 110 to determine an entity 211 associated with each piece of digitized data uploaded. For example, an issuing vendor may be an entity associated with an invoice. The record of the particular entity 211 in the entity database 210 may include multiple data elements that can be employed to identify the particular entity 211, such as its tax account number, business name including business type (i.e. Inc., Cop., etc.), Uniform Resource Locator (URL), or business phone number, as illustrated in FIG. 5. In other embodiments, additional or alternative information may be used to identify the entity 211 and may be included in the entity database records.

The entity database 210 shown in FIG. 5 has been populated with example data for illustrative purposes. According to some embodiments, each entity 211 in entity database 210 may have an associated priority 212. According to some embodiments, priority 212 may be used by data analyzer 114 to expedite entity identification S1400 and S1500 (see FIG. 9).

For each unique entity ID 214 representing a single entity 211, one or more of entity identifiers 216 may be pre-recorded. These can include entity names, tax numbers, URLs, phone numbers, etc. For each unique entity ID 214, a specific processing template ID 218 may be recorded in the same record. The processing template ID 218 may be used to query template library 220 for retrieving the processing template identified by the processing template ID 218. According to some embodiments, the entity identifiers 216 may include a discrete and predefined number of identifier fields. According to other embodiments, the entity database 210 may include a dynamic number of entity identifier fields. Entity identifiers 216 may be used to determine the entity (and thereby the specific processing template 224) associated with each digitized accounting source document.

Figure 6:
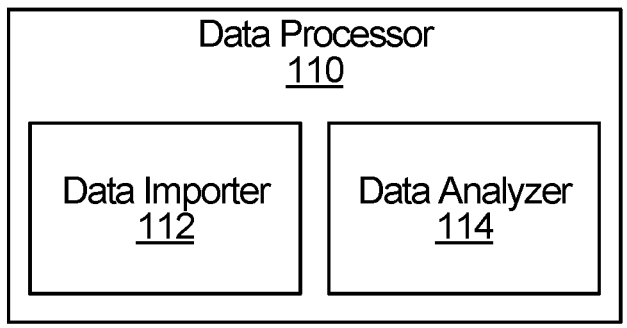
FIG. 6 is a block diagram illustrating functional components of the data processor.

FIG. 6 is a block diagram showing functional components of data processor 110. Data processor 110 includes data importer 112 and data analyzer 114. Data importer 112 may receive the digitized accounting source document 102 (FIG. 1). Data analyzer 114 may then identify an entity associated with the digitized data and stored in the entity database 210 (for example, a tax number specific to a vendor for an invoice). Based on the entity identification performed by the data analyzer 114, data analyzer 114 then may query template library 220 for a processing template for the digitized accounting source document 102. Data analyzer 114 may analyze the digitized accounting source document 102 according to the processing template and generate an output for the accounting database 104. According to some embodiments, data analyzer 114 may further post-process extracted data according to a requirement for the accounting database, or assess the accuracy or completeness of the extracted data. Further details of the operation of data importer 112 and data analyzer 114 will be described in relation to later figures.

Figure 7:
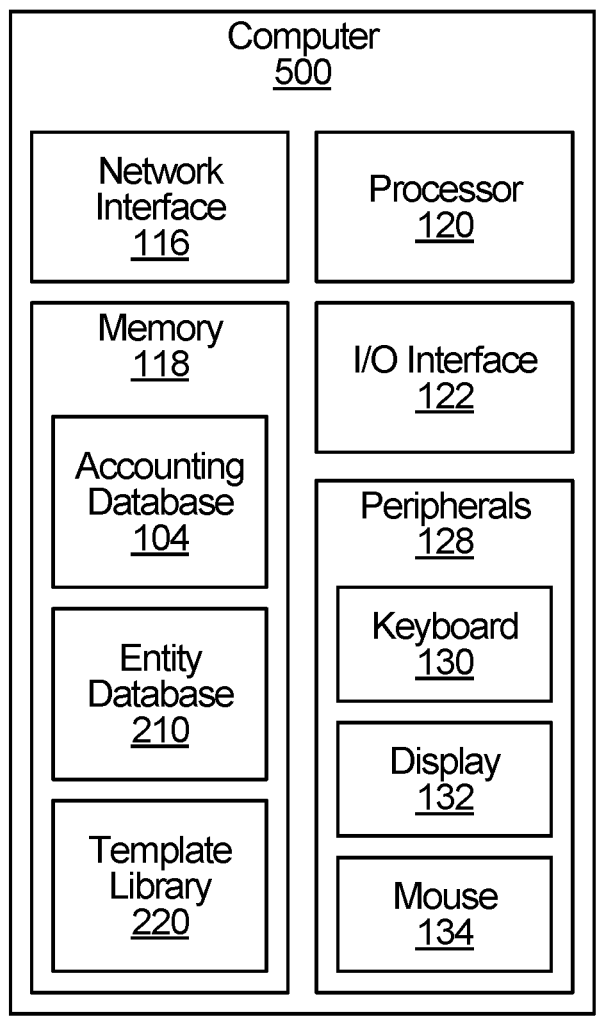
FIG. 7 is a block diagram illustrating an example computer running the data processor.

FIG. 7 is a block diagram illustrating example components of a computer 500 configured to perform the functions of data processor 110. The computer 500 may be a personal computer or a server computer. According to some embodiments, physical components or functions of computer 500 may be distributed over a network, or computer 500 may include a plurality of computing devices, computers or processors. In an example embodiment as depicted in the figures, computer 500 may include a network interface 116, a memory 118, a processor 120, and an I/O interface 122. Processor 120 may be an Intel x86, PowerPC, ARM processor or the like. Network interface 116 interconnects computer 500 to a network (not shown in FIG. 7 but see FIG. 8). Memory 118 may include storage memory, random access memory, read only memory, and writeable memory. Processor 120 may access memory 118 to access values stored therein, and may additionally write new or modify pre-existing entries. Computer 500 may include peripherals such as input and output devices interconnected to computer 500 by one or more I/O interfaces 122. These peripherals 128 may include a keyboard 130, display 132, and mouse 134. Display 132 may be a touch screen display. Additional peripherals 128 may include devices such as DVD drives, USB ports and the like for reading computer-readable storage media. Input devices may be used by a user to interact with the computer 500, such as by selecting an item with mouse 134 or typing with keyboard 130. Output devices may present information to a user such as by presenting a graphic user interface on the display 132. Software components of example embodiments of the present disclosure may be loaded into memory 118 over network interface 116 or from one or more peripheral devices.

Memory 118 may store accounting database 104, entity database 210, and template library 220. In addition, the memory 118 may store the digitized accounting source document 102. Memory 118 may include one or more storage devices and may be localized or distributed over a network. According to some embodiments, the accounting database 104, entity database 210, and template library 220 may be stored on different or separate storage media or computers (such as between network connected computers and servers). This allows for system 100 to benefit from additional processing power that may be available from a standalone server having faster hardware, and may also mitigate privacy concerns or regulations associated with data storage and location. According to these embodiments, different physical devices may communicate via network interfaces 116 and access memories 118 and instruct processors 120 to perform actions via an internal or external network (i.e. local area connection, an internet connection, etc.).

Figure 8:
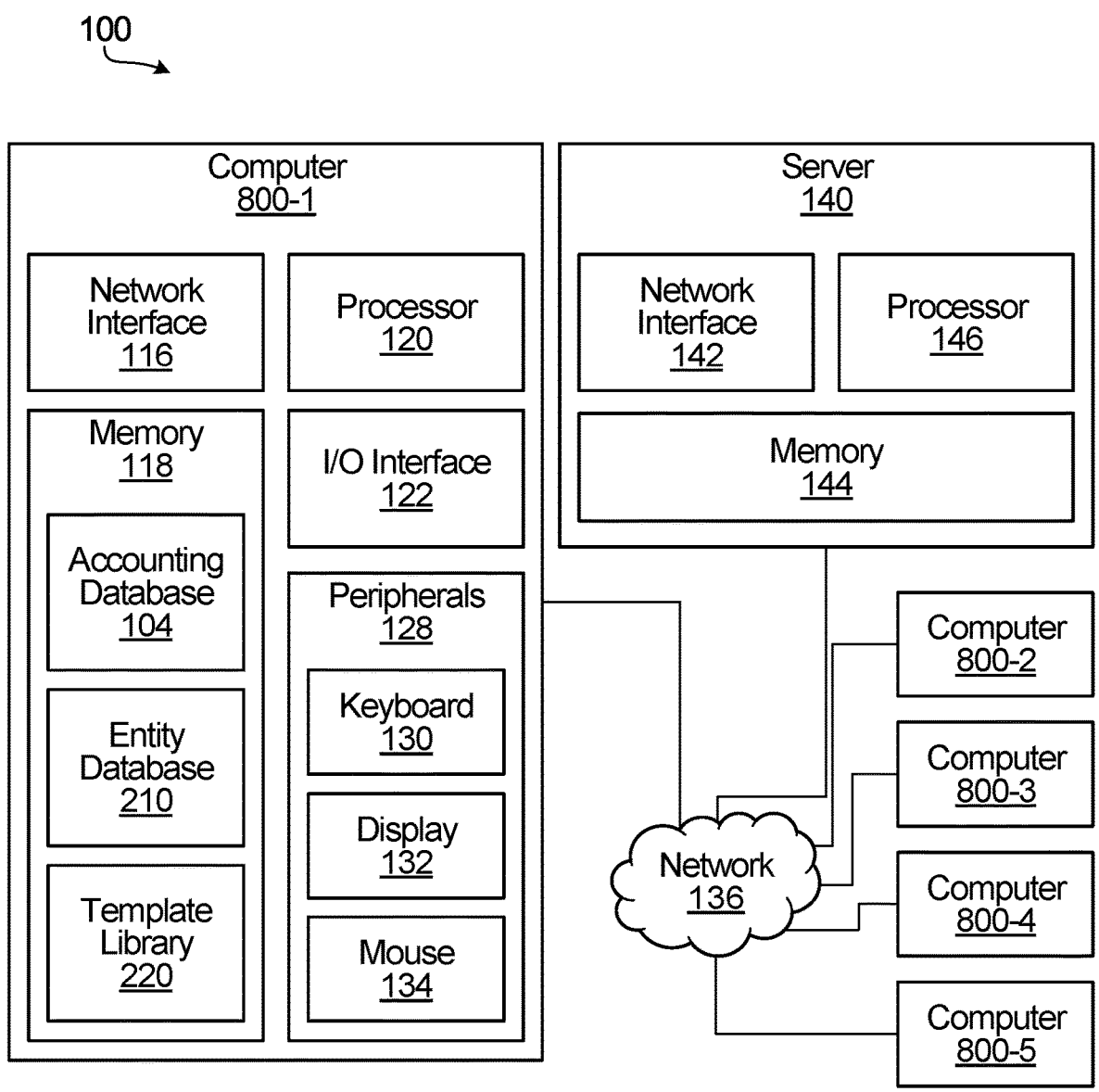
FIGS. 8 and 8A are network diagrams illustrating a computer connected with a server.

According to some embodiments, individual roles of the functional components of data processor 110 may be partially performed on different network locations or physical devices. For example, as shown in FIG. 8, each of a plurality of client computers 800-1, 800-2, and 800-3 or other electronic devices 804 (shown in FIG. 8A) having similar components such as mobile phones may be in communication via a network 136 with a server 140. Network 136 may include a local or wide area network, and may include devices and nodes connected or communicating through wired or wireless communication. Server 140 may include a network interface 142, processor 146, and memory 144. Processor 120 and processor 146 each has access to instructions stored in memory 118 or memory 144 respectively to perform actions described herein.

According to some embodiments, functions of data importer 112 may be performed on a client computer 800, and functions of data analyzer 114 may be performed on the server 140. Similarly, the entity database 210 and template library 220 may be stored at server 140, while the accounting database 104 may be stored on a local client computer 800, which may be the computer 500. Further, the client computer 800 may supply digitized data in the form of a digitized accounting source document 102 to the server 140 for processing as described above, where the server 140 performs some or all of the functions of computer 500 as described above. The server 140 may communicate the processing results to the client computer 800 over the network 136. Computer 800 may modify the accounting database 104 based on the processing results. Client computer 800 and server 140 may employ encryption or other security features (such as hash-tokens) to ensure that all incoming/outgoing connections via network interfaces 116 are connected to the authorized network location.

According to some embodiments, I/O interface 122 may include input and output devices or integrated input/output devices. Input devices may include a mouse, keyboard, touchpad, or touch screen, microphone, or the like. Output devices may include display devices such as a monitor, speakers or the like. A graphic user interface (GUI) may be displayed on a display 132 of computer 500 for interaction with a user. A user may enter input on the GUI using a mouse, keyboard, etc., such as to enter commands or to enter operational settings or parameters for being used by the data processor 110. For example, the user may use the GUI to specify a specific file address in the memory 118 for the digitized accounting source document 102. Additionally, the GUI may be used to add entries into the entity database 210 and template library 220. Example user interfaces will be described in relation to later figures.

Figure 8A:
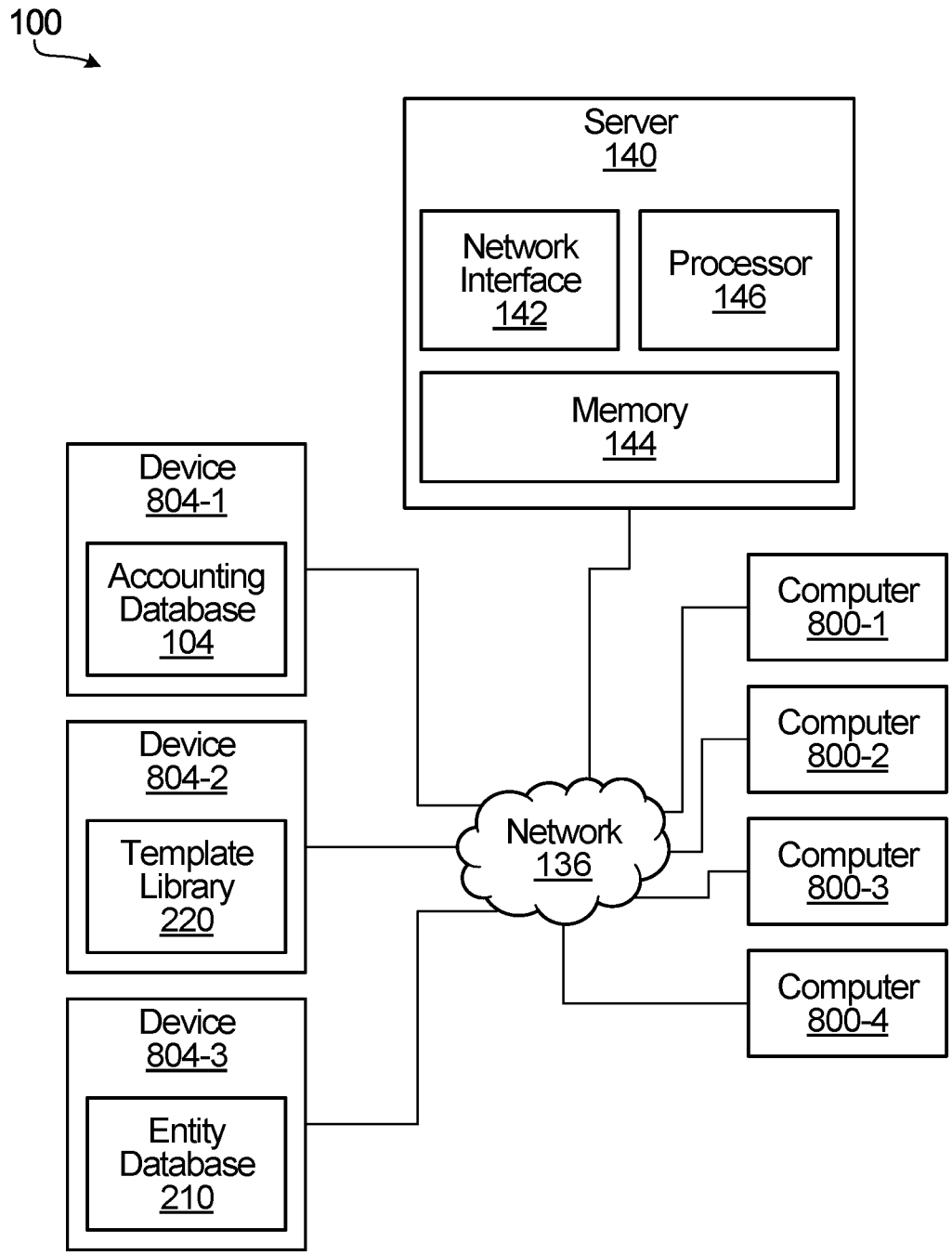

According to some embodiments, as shown in FIG. 8A, entity database 210, template library 220, and accounting database 104 may each be stored on a separate network-connected device 804, accessible by the server 140 or both the server 140 and selected client computers 800. Devices 804 may have identical components as server 140, including a network interface, processor, and memory. According to these embodiments, the client computer 800 may supply digitized data in the form of a digitized accounting source document 102 to the server 140 for processing as described above, where the server 140 performs some or all of the functions of computer 500 as described above. The server 140 may communicate the processing results to the device 804-1 having accounting database 104 stored thereon. Device 804-1 may modify the accounting database 104 based on the processing results.

Figure 9:
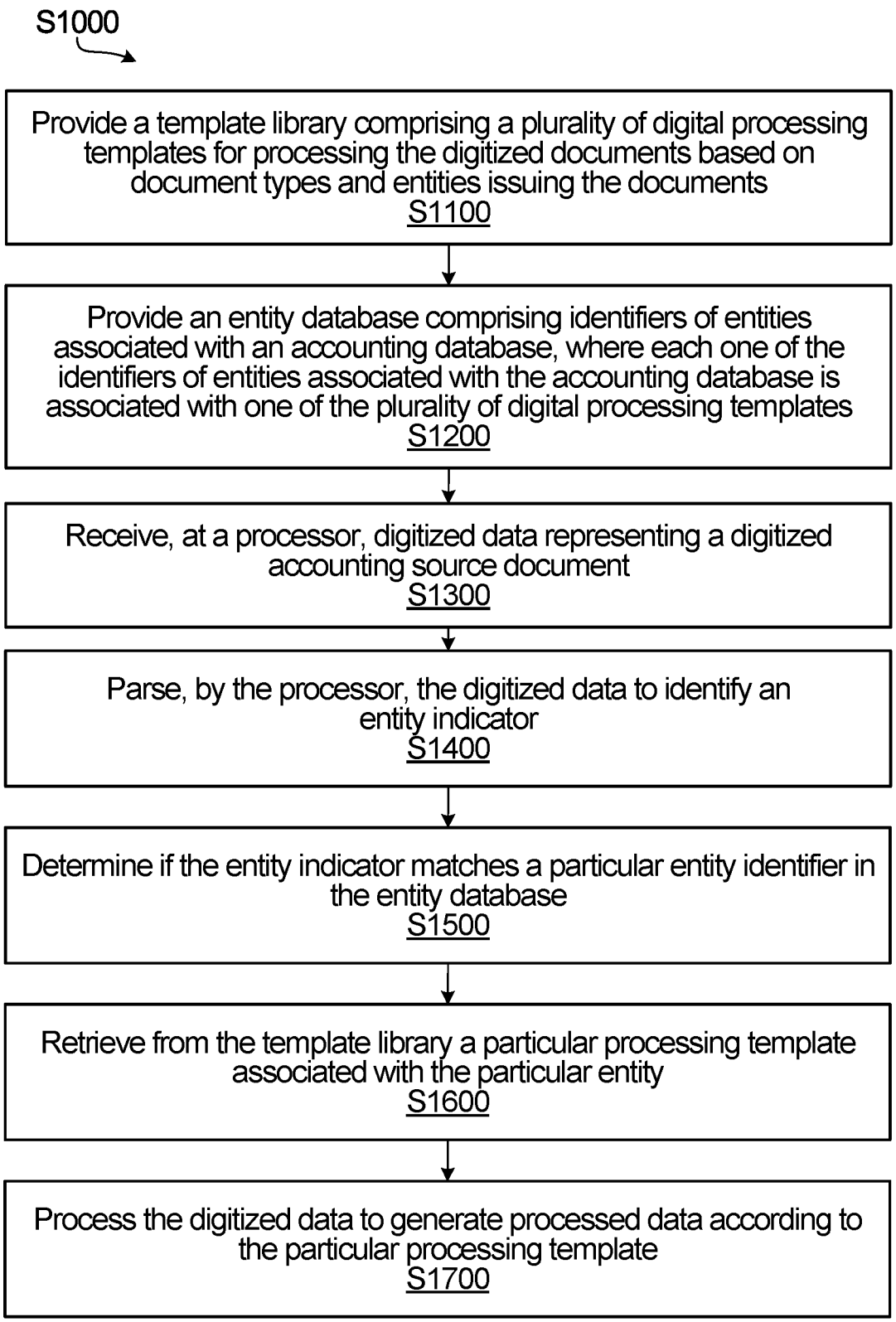
FIG. 9 is a flowchart illustrating a method of populating a database.

FIG. 9 shows a flowchart in a process S1000 for generating accounting data for populating the accounting database 104 based on digitized accounting source documents. The method may be performed using the computer 500 or the server 140 or the client computer 800 or the device 804 or computer system 100.

At step S1100, a template library 220 is provided. The template library 220 includes a plurality of digital processing templates 224 for processing digitized documents based on document types and entities issuing the digitized accounting source documents. Template library 220 is stored on a computer or processor readable storage media such as a computer memory, which may be located at computer 500 or server 140 or a client computer 800 or a device 804.

At step S1200, an entity database 210 is provided. The entity database 210 includes identifiers 216 of entities 211 associated with an accounting database, where each one of the identifiers is associated with one of the plurality of digital processing templates 224. According to some embodiments, the identifiers 216 in the entity database 210 indicate entities associated with the templates or digitized data.

At step S1300, digitized data in the form of a digitized accounting source document 102 representing a digitized accounting source document is received. The digitized data may be an invoice in the form of tabulated digitized data. According to embodiments where the digitized data is unformatted, data importer 112 may generate, based on the digitized accounting source document 102, tabulated digitized data.

At step S1400, the processor will parse the digitized accounting source document 102 to identify an entity identifier 216. According to some embodiments, the entity identifier 216 may be a keyword for the business name of the entity, or its phone number, business or tax number, or URL. Data analyzer 114 searches in the digitized accounting source document 102 in the form of a tabulated digitized data for any entity identifier associated with the digitized data. Searching of the digitized accounting source document 102 may be performed using the methods described in relation to FIG. 14. The searching may be done by using predefined keywords, or alternatively using data retrieved from the entity database 210 (such as phone numbers).

At step S1500, data analyzer 114 will determine if the entity identifier 216 identified in S1400 matches a particular entity identifier in the entity database 210. According to some embodiments, this may be done by data analyzer 114 using the extracted entity identifier from S1400 to query the entity database 210. If an entry in entity database 210 matches with the entity identifier on the digitized accounting source document, the digitized data may be processed based on a processing template associated with the particular entity identifier. According to other embodiments, alternatively this can be done by using the values in the entity database 210 (such as a phone number) to search the digitized accounting source document 102.

At step S1600, the particular processing template 224 associated with the particular entity 211 is accessed by data analyzer 114 from the template library 220. Data analyzer 114 may query the template library 220 for the particular processing template 224 associated with the particular entity. This resulting processing template contains specific instructions for data extraction from the digitized accounting source document 102.

At step S1700, data analyzer 114 processes the digitized data to generate processed data according to the particular processing template 224. Processed data may include extracted data necessary for storage in accounting database 104. For example, a processing template for the digitized data as shown in FIG. 2 may include instructions that data analyzer 114 should first search for the text "Invoice #" in the tabulated invoice. The processing template may further dictate that the data information to be extracted for an invoice number is at the right-hand neighbour having relative location information (x, y+1). The template may include additional and similar instructions to identify and format the date, and to determine the amount of items, the subtotal, the tax, the total, etc. Data analyzer 114 will follow the particular processing template 224 to generate all necessary processed data. According to other embodiments where the digitized accounting source document is a POS receipt, the data analyzer 114 may process information by parsing the digitized data to locate a line containing a phrase above lines of product. Then, based on the location of the line containing the specific phrase, parsing, line-by-line, starting from the first line of product(s), each line of product to obtain processed data.

According to some embodiments, the method S1000 may further include verifying the data for completeness and accuracy. The items to be verified for each document may comprise invoice number, invoice date, subtotal amount, total amount, etc.

Further details and various embodiments of implementation of individual steps S1100-S1700 may be described in relation to later figures.

FIG. 10 shows an example graphic user interface 1000 for obtaining input from a user to generate or update a processing template 224. The processing templates 224 may be stored as database structure in template library 220 and may be viewed or modified using a computer (such as computer 500) accessing the interface as shown.

The interface 1000 includes fields for data entry by a user. Each field may be assigned an individual identifier 9010 (also referred to as "keyword" or "keywords" herein). Some fields may be provided to enter an alias 9020 for a keyword, and a relative location 9030 of the data element associated with the identifier 9010 or alias 9020 in the tabulated document with reference to the location of the cell that contains the identifier 9010 or alias 9020, which is indicated its row and column numbers (row, column). Further fields may indicate format of data found in the digitized accounting source document, such as the format of a date (i.e. if it starts with days, months, or years). According to some embodiments, some fields may be prepopulated, such as based on previous user input or data from a standard or base template. Further, some pre-set or standard fields (such as the relative location information of the "unit of measure" or "Quantity" as shown in FIG. 10) may not be modifiable by the user in certain situations, which are indicated by the shaded-out fields in FIG. 10. Further description of the specific fields will be described in relation to FIG. 10A.

FIG. 10A shows another screen image of the graphic user interface 1000 after entries in some of the fields have been entered by the user. For illustration purposes, the entered data entries in FIG. 10A correspond to those in the digitized accounting source document of FIG. 2. As shown, the processing template 224 has been assigned a template ID 218 with a value "9001".

For instance, an example processing template 224 stored in template library for the parameters displayed in FIG. 10A may contain the information shown in Table 1 below.

TABLE I

| | |
|---|---|
| ID_ | 9001 |
| TEMP_NAME_ | ABC Inc(General Operating Expense and Other Asset Purchase Template) |
| CATEG_ | 1 |
| GIVEN_ | 0 |
| INV_NUM_ALIAS_ | Invoice # |
| INV_NUM_LOCA_ | {"no":101,"text":"row+0, column+1","offset":"0,1,0"} |
| INV_DATE_ALIAS_ | |
| INV_DATE_LOCA_ | {"no":101,"text":"row+0, column+1","offset":"0,1,0"} |
| INV_DATE_RSVD1_ | MM/dd/yyyy |
| VEND_ITEMNUM_ALIAS_ | Product Number |
| VEND_ITEMNUM_LOCA_ | {"no":109,"text":"row+1,column+0","offset":"1,0,0"} |
| DESC_ALIAS_ | |
| DESC_LOCA_ | {"no":109,"text":"row+1,column+0","offset":"1,0,0"} |
| DESC_RSVD1_ | Y |
| UNIT_ALIAS_ | Unit |
| UNIT_LOCA_ | {"no":109,"text":"row+1,column+0","offset":"1,0,0"} |
| UNIT_PRICE_ALIAS_ | |
| UNIT_PRICE_LOCA_ | {"no":109,"text":"row+1,column+0","offset":"1,0,0"} |
| QTY_ALIAS_ | |
| QTY_LOCA_ | {"no":109,"text":"row+1,column+0","offset":"1,0,0"} |
| PRE_TAX_AMT_ALIAS_ | Amount |
| PRE_TAX_AMT_LOCA_ | {"no":109,"text":"row+1,column+0","offset":"1,0,0"} |
| PRE_TAX_SUB_ALIAS_ | Subtotal |
| PRE_TAX_SUB_LOCA_ | {"no":101,"text":"row+0, column+1","offset":"0,1,0"} |
| TAX1_SUB_ALIAS_ | HST 13% |
| TAX1_SUB_LOCA_ | {"no":101,"text":"row+1, column+0","offset":"1,0,0"} |
| TAX2_SUB_ALIAS_ | |
| TAX2_SUB_LOCA_ | {"no":0,"text":"None","offset":null} |
| FRT_ALIAS_ | Shipping |
| FRT_LOCA_ | {"no":101,"text":"row+0, column+2","offset":"0,2,0"} |
| DISC_ALIAS_ | |
| DISC_LOCA_ | {"no":0,"text":"None","offset":null} |
| FRT_DISC_ALIAS_ | Shipping Discount |
| FRT_DISC_LOCA_ | {"no":2,"text":"Same cell - at the right of the keyword","offset":"0,0,1"} |
| TOTAL_ALIAS_ | |
| TOTAL_LOCA_ | {"no":101,"text":"row+0, column+1","offset":"0,1,0"} |
| PMT_TERM_ALIAS_ | Term |
| PMT_TERM_LOCA_ | {"no":101,"text":"row+0, column+1","offset":"0,1,0"} |
| COMPANYID_ | 1001 |
| COMPANYNAME_ | ABC Inc |

The processing template 224 includes the identifiers 9010, aliases 9020, and locations 9030 for a specific data entry in digitized accounting source document 102. According to some embodiments, processing templates may be customized manually through a graphic user interface. According to other embodiments, processing templates may be predefined and exported on another computer 500 into a computer readable format. Templates may then be imported into the template library 220 by computer 500 hosting the data processor 110.

Identifiers 9010 are primary keywords of content information for data to be extracted. For example, for each element of data to be extracted, the text for each identifier 9010 will be used as a search phrase. Aliases 9020 can be related words or alternative search phrases shown on the digitized accounting source document 102 if the search for the identifier 9010 does not generate any results. For example, the phrases "HST" and "Tax" may relate to the same required data for extraction. If an entity is known to use an alias 9020 in their digitized accounting source document 102, the alias 9020 may be recorded in the processing template. Use of common aliases 9020 further allows for continued performance regardless of any changes between versions of digitized data over time from the issuing entity (for example, the entity is to switch without warning to use "Invoice #" instead of "Invoice Number").

For each populated value in processing template 224, a format information including a location 9030 is defined. The locations 9030 are relative location information for locating data information associated with specific and related keywords or aliases in the digitized accounting source document 102 for the entity ID 214 to find the value of the data. For example, locations 9030 could be at the left or right side of a cell in which the related keywords are located or be defined by a relationship in a Cartesian coordinate system. As can be seen, the location 9030 for identifier 9010 of "Invoice Number" having an alias 9020 "Invoice #" is "row+0, column+1", relating to the right-hand next column in the same row to the phrase "Invoice Number" or "Invoice #". According to some embodiments, the identifiers 9010 and aliases 9020 may be stored as strings, and the locations 9030 may be stored as two numerical data structures, one indicative of the row increment, and one indicative of the column increment.

As an example, data analyzer 114 may first search for the text for identifier 9010 "Invoice Number" in digitized accounting source document 102. If the text "Invoice Number" appears in the digitized accounting source document 102, a location of the cell containing the text "Invoice Number" will be returned. If the text "Invoice Number" does not appear in the digitized accounting source document 102, data analyzer 114 may re-try the search using an alias 9020 (i.e. "Invoice #"). If the text "Invoice #" appears in the digitized accounting source document 102, a location of the cell containing the text "Invoice #" will be returned. If neither the identifier 9010 nor alias 9020 search result is in any cell location, an error message may be generated or logged. Based on the location of the identifier 9010 or alias 9020, data analyzer will modify the location based on the location 9030 in the particular processing template 224. As shown in this example, for "Invoice #", the location 9030 is a string having the value "row+0, column+1". Accordingly, based on this location 9030, data analyzer 114 will query the processing template to find that the row increment value is zero and the column increment value is 1. Then, data analyzer will extract the data value stored at the location having the same row and the adjacent column location to generate processed data. Conveniently, when the particular processing template 224 specifies an alias for a keyword (such as the alias "Invoice #" for the keyword "Invoice Number"), the data analyzer 114 may be configured to search for the presence of the alias first, or search for only the presence of the alias, thus reducing processing time and increasing processing efficiency. The processing template 224 may also include a flag or indicator indicating if both the alias and the standard keyword should be searched. The flag may be a toggled flag that can be set by a user.

FIG. 11 shows an example graphic user interface 1100 for obtaining input from a user to generate or update a processing template 224 for extracting data from POS receipts represented by digitized accounting source document 102. The content of the processing template generated or updated using the graphic user interface 1100 may be stored or represented by a table similar to Table I.

For POS receipts, the relevant accounting information associated with a sold or purchased item or product (such as the price or cost of the item/product) is typically listed next to the name or the identifier of the item/product on the same line. Thus, in the tabulated format of the digitized receipt, the cost etc. of the product is usually located on the same row as the identifier of the product, but to the right. Accordingly, the use of relative location information as previously described with reference to invoices may not be necessary for POS receipts. A potential difficulty, however, for locating the products listed on the POS receipts, is that the POS receipts may have different formats and may have numerous product identifiers that would be difficult to define in the processing template. Thus, a convenient way to locate the first product line in the POS receipt is provided in an embodiment of the present disclosure as discussed further below. Some fields in FIG. 11 are similar to the corresponding fields shown in FIG. 10. For example, some fields in the processing template for POS receipts (such as Subtotal, Tax amount 1, Tax amount 2, and Total) may be provided for defining alias 9020 for keywords or identifiers 9010, which may then be used during processing as discussed herein. Further fields may indicate the format of data found in the digitized accounting source document, such as the format of a date (i.e. if it starts with days, months, or years).

FIG. 11A shows another screen image of the interface 1100 after some data having been entered by a user. For illustration purposes, the entered data entries in FIG. 11A correspond to those in the digitized POS receipt of FIG. 3. As shown, the processing template 224 has been assigned a template ID 218 with a value "9002". This example processing template 224 further includes instructions to data analyzer 114 for extracting data from POS receipts represented in digitized accounting source document 102.

Typically, POS receipts may not contain any invoice number. Thus, according to embodiments where the digitized accounting source document 102 is a POS receipt, the data analyzer 114 may assign the document an invoice number for processing and recording purposes. The assigned invoice number may be based on an extracted purchase data and time from the POS receipt. Date and time may be extracted from the POS receipt based on a defined format pattern as defined in the processing template 224. For example, a particular processing template may define if the date on the POS receipt is in the form of Month-Day-Year, Year-Month-Day, Day-Month-Year, etc.

According to some embodiments, the processing template 224 may include additional information for determining the location of specific data in the digitized accounting source document 102. For example, as can be seen in FIGS. 11 and 11A, the processing template 224 may identify a specific string appearing directly above the lines of products in a POS receipt, as the "Phrase above 1st line of products." This phrase or string may be defined by a user based on the format of the particular POS receipt issued by the particular vendor. For example, the POS receipt of FIG. 3 shows text "HST 863624433" as the phrase just above the first line of the lines of the purchased products. Correspondingly, the "Phrase above 1st line of products." may be specified as "HST 86" as illustrated in FIG. 11A. As can be understood, this phrase may be shortened (such as from "HST 863624433" in the present example) as long as the shortened phrase is unlikely to appear elsewhere on a POS receipt. By identifying that the lines of products start immediately after the occurrence of "HST 86", the location of the first line of product in the digitized accounting source document 102 can be conveniently determined and used as a starting point for determining individual products to extract. Providing this starting position is convenient for POS receipts as such receipts often have varying formats and the contents of the product lines are different for different receipts. Without the information indicating the first line of products, it would require a complicated processing procedure to determine where the product lines are in the receipt. In processing, the data analyzer 114 may locate the phrase indicating the position before the first line of product. Then, the first line in the lines of products may be identified. Data analyzer 114 may parse each product line, line-by-line starting from the first line, to obtain the product identifier(s) and the associated price information.

Processing template 224 may indicate a format or location of product numbers in the digitized accounting source document 102. For example, the processing template 224 may indicate the number of characters a product number will have, and whether the product numbers can include dashes.

For each product number, an associated price and product description may be extracted. According to some embodiments, the price may be identified in the digitized accounting source document 102 by determining the rightmost number that includes two decimals on the same line as the product number. After extracting the product number and the price for a product, the remaining characters in this product line may be extracted as a description for this product.

The product identification and extraction process as previously described may be repeated until all products on the digitized accounting source document 102 have been identified. This determination may be made if the next nonblank line in the digitized accounting source document 102 to a product number includes a specific keyword, such as "Subtotal". Alternatively, this determination may be made if a line is nonblank and does not contain a product number matching the patterns defined in the processing template 224. Further, this determination could be made by including in the processing template 224 a final line to indicate that no product entries exist in or below the line of the occurrence of a specific string.

Once products have been identified and analyzed, the values for pre-tax subtotal, tax amounts, and total may be extracted. The system will first locate those items based on the identifier 9010 or their aliases 9020 shown on the processing template 224, and then extract the numeric value usually at the side of each item.

For instance, an example processing template 224 stored in template library 220 for the parameters displayed in FIG. 11A may contain the information shown in Table 2 below.

TABLE 2

| | |
|---|---|
| ID_ | 9002 |
| TEMP_NAME_ | Dollarama(POS Template) |
| CATEG_ | 2 |
| GIVEN_ | 0 |
| INV_DATE_FORM_ | yyyy/MM/dd |
| KEY_V_ABV_ITEM_VALUE_ | HST 86 |
| ITEM_NUM_MIN_VALUE_ | 12 |
| ITEM_NUM_FMT_VALUE_ | No |
| ITEM_NUM_LOCA_VALUE_ | No |
| PRE_TAX_SUB_ALIAS_ | |

TABLE 2-continued

| | |
|---|---|
| TAX1_SUB_ALIAS_ | HST 13% |
| TAX2_SUB_ALIAS_ | |
| TOTAL_ALIAS_ | |
| COMPANYID_ | 1002 |
| COMPANYNAME_ | Dollarama |

FIG. 12 is an example of implementation of method step S1300 for receiving digitized accounting source document 102, according to one embodiment. According to some embodiments, data importer 112 may receive multiple digitized accounting source documents as a single uploaded piece, and may receive digitized accounting source documents that may span multiple pages. Therefore, if the received digitized accounting source documents contain multiple digitized accounting source documents, it is necessary to subdivide the received tabulated digitized accounting source documents and generate a single tab of tabulated digitized data representative of all information relating to a single accounting source document, such as receipt, invoice, or the like.

At step S1302, the positions at which to subdivide the received tabulated accounting source documents are determined. These may be predefined and received as a user input (for example, the user may indicate through a GUI on display 132 that the bulk upload contains only two-page invoices).

At step S1304, based on the determination in step S1302, data importer 112 may process the digitized accounting source document 102 into individual subdivisions. For example, for an uploaded file only containing two-page invoices, two related consecutive pages will be combined and saved as a new tabulated file which contains only one tab representing a two-page invoice.

The new tabulated document may be renamed in the format of the original document name followed by the total number of pages in the original digitized accounting source document and a tab name for the starting page number of each invoice in the same document which is the tab name of the first page of the accounting source documents included in. For example, if a document "ABC" includes three two-page accounting source documents, i.e. a single document including six tabs of tabulated data, in which tab 1, tab 3, and tab 5 are the first (starting) pages of an individual invoice, after conversion of the file, three new tabulated documents may been created with respective names of ABC(2_tab1), ABC(2_tab3), and ABC(2_tab5). The same process may be applied for other page groups of uploaded documents. For user convenience and processing efficiency, a user may upload batches of documents collected based on the number of pages. Then, data analyzer 114 may parse each separated document one by one.

FIG. 13 illustrates an example process within S1400 to parse the digitized data to identify an entity identifier, according to some embodiments.

At S1402, data analyzer 114 may search the digitized accounting source document 102 to locate a text string matching a keyword from a list of pre-defined keywords. For example, data analyzer 114 may search using a list of pre-defined keywords associated with business names, such as "inc.", "corp.", "ltd.". Alternatively or in addition, the list of pre-defined keywords may be associated with a tax number, phone number, or URL. Based on the results of the search, data analyzer 114 will determine if the specific keyword appears in the digitized accounting source document 102. If the data analyzer 114 determines that the specific keyword appears in the data, it may return a location for the keyword occurrence. According to some embodiments, a business name, symbol for a tax number, or URL component may be used in the list of pre-defined keywords. The pre-defined keywords or different lists of the keywords may be stored in the entity database or separately stored in a suitable location.

In a method where the keyword list is related to business names, keywords such as: Corporation, Corp, Co., Company, Inc, Ltd, LLC, LP, P.A., Association, etc., are used to be detected by the system to locate a vendor name in a digitized accounting source document.

Alternatively, data analyzer 114 may search the digitized accounting source document 102 using the entity database 210. This may be done by selecting a record from the entity database 210, based on its priority, and retrieving, for example, a phone number string from the record. Then, data analyzer 114 may search the digitized accounting source document 102 for presence of a string matching the phone number string retrieved from the selected record of the entity database 210. This search may include a string matching the retrieved phone number string with a text string with the same string length in the digitized accounting source document 102. The matching may be performed using pattern matching and regular expressions (RegExp), as can be understood by those skilled in the art. If the selected phone number string matches any string present in the digitized data, the entity associated with the selected record is identified as the particular entity issuing the related source document. If there is no match, another record in the entity database 210 is selected based on its priority, and another phone number string is retrieved from the newly selected record for searching the digitized data for a match. The data analyzer 114 may iteratively select a next record from the entity database 210 and repeat the search/matching until a match is found, or all records from the entity database 210 have been exhausted. This iterative reverse matching approach may be efficient and convenient because in many cases it is difficult to identify which text or number strings in the digitized accounting source document 102 represents a phone number due to the various possible formats used to represent phone numbers, the possible variation in the length (number of digits) of the phone numbers, and the possible various placement of the phone number on an accounting source document. Typically, an entity will present its phone number in a consistent format or string pattern on its own source documents. The format or string pattern for the phone number may be stored in the entity record of the entity database 210 for speedy matching in the digitized accounting source document 102. Thus, the phone number string in the record has a predefined pattern and the predefined pattern may be used to find a match in the digitized accounting source document 102.

In addition, other searching methods may be deployed to use phone numbers from records of the entity database 210 as a keyword or part of a keyword to search phone numbers in the digitized accounting source document 102. For example, only using partial components of phone numbers retrieved from records of the entity database 210.

At step S1404, data analyzer 114 will parse adjacent data to the located keyword from step S1402 for an entity identifier. For example, the full text of the cell including the phrase "inc." may be identified as the entity name. The full vendor name (vendor name itself plus its suffix) is then used to query the entity database 210. For example, if ABC Inc (FIG. 2) is shown in the file for the digitized data, the suffix "Inc" can be identified first, then the letters "ABC" before "Inc" can be extracted. Finally, the full name "ABC Inc" can be used to search the entity database 210 to see if the same name exists in the entity database 210 (i.e. step S1500). If the keyword is "www", the following text after "www." may be used to query the database to see if the URL exists in a record in the entity database.

Figure 14:
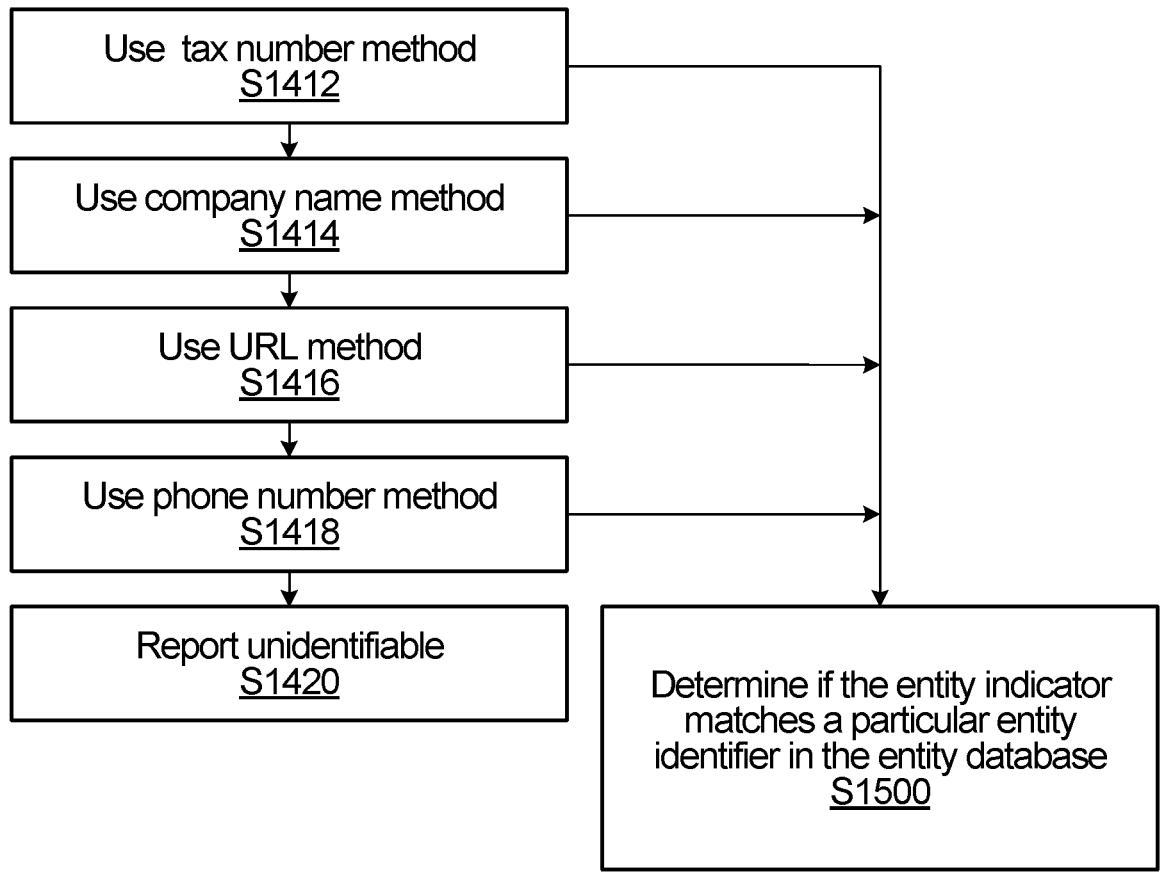
FIG. 14 is a flowchart illustrating steps of the method of parsing digitized data for an entity identifier.

According to an embodiment, as shown in FIG. 14, a tiered approach may be used to identify the entity (vendor) associated with the digitized document. The method as previously described in relation to FIG. 13 may be employed at each of steps S1412 through S1418. However, keywords used may differ in each of steps S1412-S1418.

At step S1412, a tax number parsing method may be used. For example, a business tax account number may be used as a keyword for the accounting source document in the sub-method as described in relation to FIG. 13. Typically, each registered business has its own unique tax account number, for example, a Goods and Services Tax (GST) registration number in Canada, with a certain format prescribed by the government and the number may be shown on the accounting source document.

If the related keyword, such as "GST registration number", or its alias, "GST #", is identified in the digitized data, the location of the corresponding value of the keywords can be detected either in another cell located at right/left/below of the cell at which keywords/aliases are located, or at the right/left side of keywords/aliases in the same cell. Next, a nine-digit account number can be extracted based on the format of tax account number as the entity identification number. The format of a business or tax number may also have a certain pattern. For example, a Canadian GST number may be a nine-digit number or a nine-digit number and program identifier (like "RT") plus reference number (like "0001"), for example: 111111111RT0001.

If a value is found, data analyzer 114 proceeds directly to step S1500, wherein the entity identifier is compared to the entity database 210.

If the entity identification method is unsuccessful, another entity identifier method, such as a company name parsing method at step S1414 may be employed. For example, the business type (suffixes) as described in relation to FIG. 13 may be used as searching keywords. If a value is found, data analyzer 114 proceeds directly to step S1500, wherein the entity identifier is compared to the entity database 210.

If the entity identification method is unsuccessful, a URL parsing method at step S1416 may be employed. Similar to using a corporate suffix, as described in relation to FIG. 13, a domain suffix may be used in the plurality of keywords. A web link or universal resource location (URL) may be identifiable in the accounting source document that is associated with the issuing entity. Typically, many businesses have their own business websites with URLs which are usually shown on their invoices. A URL has a certain format usually starting with "http" or "www" and ending with certain suffixes, including but not limited to, ".com", ".ca", ".net", ".org", ".gov", etc. If a URL is identified based on the URL format in the digitized accounting source document, the letters between "http" or "www" and suffix will be extracted. The extracted letters plus the suffix are used to match the URL value in entity database 210. For example, a URL, "www.abc.com", is shown in the input file (FIG. 2). The query text "abc.com" can be extracted.

If a URL is detected, data analyzer 114 proceeds directly to step S1500, wherein the entity identifier is compared to the entity database 210.

If the entity identification method is unsuccessful, a phone number method at step S1418 may be employed. Each vendor may have one or more phone numbers as contacting information stored in the entity database 210. The vendors may further be grouped based on their assigned priorities. Accordingly, data analyzer 114 may iteratively select records and phone number strings from entity database 210 in the order of their associated priorities, and use the current phone number string to search the digitized accounting source document 102 for a match, until a match is found or the records in the entity database 210 have been exhausted. Data analyzer 114 may search the digitized accounting source document 102 for a string matching the currently selected phone number string. If the selected phone number string is found in the digitized accounting source document 102, data analyzer 114 will proceed to step S1500 and determine that the entity identifier (phone number in this case) matches the selected entity identifier (phone number) in the entity database 210. If the phone number string is not found, data analyzer 114 may then iteratively select another phone number string from entity database 210 and repeat the matching process until all records in the entity database have been exhausted.

According to some embodiments, a priority 212 may be assigned to each record or entry in the entity database 210. The priority 212 may be assigned manually by a user, or by the data analyzer 114 based on the frequency of occurrence of digitized data being inputted for the specific entity ID. For example, if a specific vendor's invoices were very frequently uploaded to data processor 110, the priority level may be increased. Using the priority indicator, data analyzer 114 may determine a specific order in which to select the phone number in step S1418 to then search the digitized accounting source document 102. For example, if three vendors in entity database 210 have a top priority, data analyzer 114 would first determine if the entity identifier extracted corresponds to one of the three top priority vendors. If no results were found in the three top priority vendors, the data analyzer 114 may move to querying a second priority tier, then a third, etc. This way, the likelihood of finding an entity match in the entity database 210 is faster than having to search through all values of an unprioritized database. According to some embodiments, the priority level may be assigned by a user to each vendor in entity database 210. Alternatively, the priority level may be determined algorithmically.

A similar tiered and prioritized approach to data retrieval may be employed within an individual entity identifier method S1412-S1418. For example, in order to efficiently identify vendor names by using phone numbers, users may assign the vendors four categories based on the frequency of purchases from the vendors. The four categories may be highly frequent, frequent, occasional, and rare. When a phone number method starts to execute, vendor records in the highly frequent category are first selected to identify a match within the digitized accounting source document 102. If no record in the high frequency category contains a matched phone number, the records in the lower frequency categories, in order of frequent, occasional, and rare will be iteratively selected for finding a match.

As an illustrative example, the entity database 210 as shown in FIG. 5 will be used for entity identification using step S1418. If entity 211 is unable to be identified using the prior methods, data analyzer 114 may use the phone numbers in the entity database 210. The phone numbers may be selected based on the priority 212. Data analyzer 114 will first search the digitized accounting source document 102 for presence of the phone numbers relating the entity ID 214 with value 1001 (i.e. ABC Inc). The search may be a case and format sensitive string search for all phone numbers associated with the specific entity 211 (i.e. "416-000-0001", "417-000-0001", and "418-000-0001"). If there are no matches, data importer may next select the phone numbers relating the entity ID 214 with value 1002 (i.e. Dollarama). The search may be a case and format sensitive string search for all phone numbers associated with the specific entity 211 (i.e. "4160010002", "4170010002", and "4180010001"). If there are no matches, data analyzer 114 may next select the phone numbers relating the entity ID 214 with value 1003 (i.e. Costco Inc.). The search may be a case and format sensitive string search for all phone numbers associated with the specific entity 211 (i.e. "416.002.0002", "417.002.0002", and "418.002.0002"). If the string "416.002.0002" is found in digitized accounting source document 102, data analyzer 114 will proceed to step S1500 and determine that the entity identifier (phone number in this case) matches a selected entity identifier in the entity database 210.

In the case that all tiered approaches to entity identification are unsuccessful, at step S1420, data analyzer 114 may report that the entity is unidentifiable, and then move on to the next piece of digitized accounting source document 102 for the data processor 110.

Figure 15:
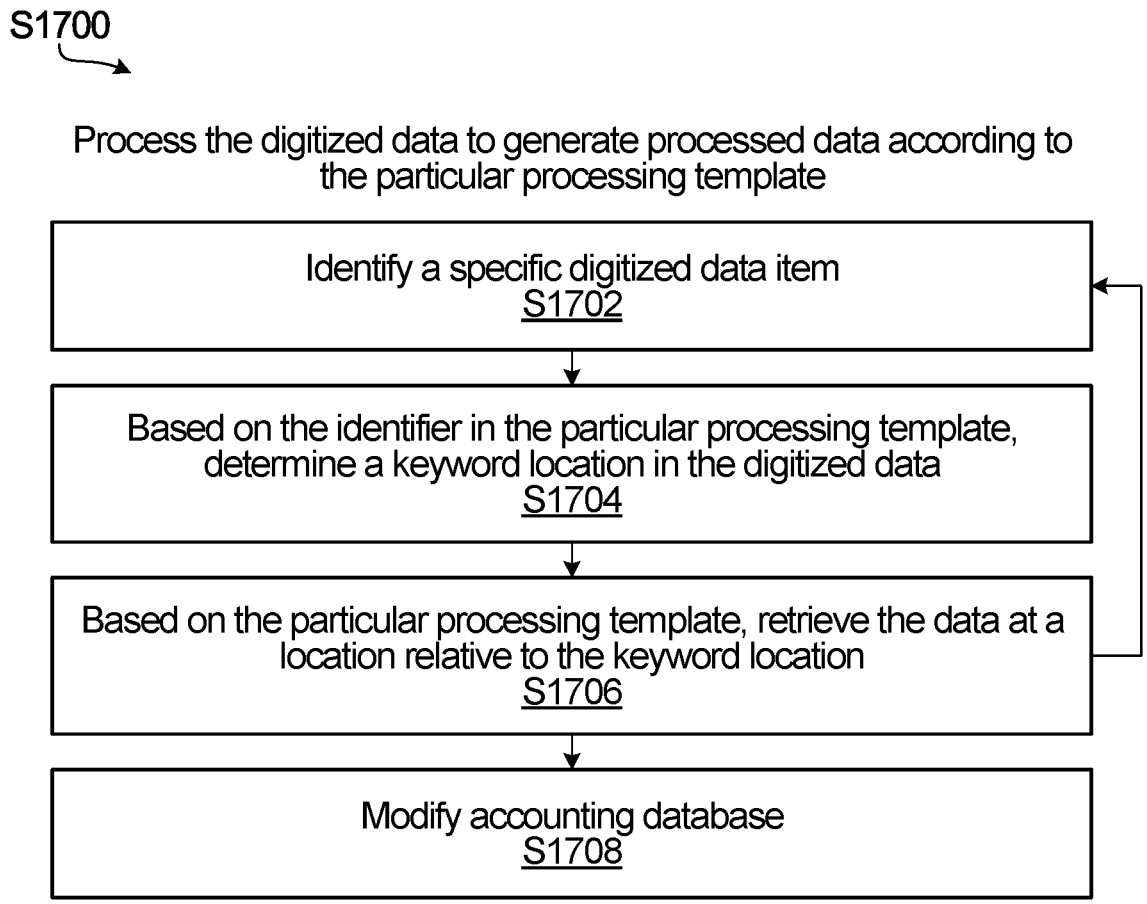
FIG. 15 is a flowchart illustrating a method of processing digitized data based on a template.

FIG. 15 is an example of sub-steps within step S1700 of processing the digitized data to generate processed data according to the particular processing template, according to one embodiment. Data analyzer 114, based on a particular processing template 224, will process the digitized data to extract the necessary data for the entity.

At step S1702, a specific digitized data item is identified. This is done by data analyzer 114 selecting a specific entry from the processing template 224. For example, a first item to be searched for in an invoice may be an invoice number.

At step S1704, based on an identifier 9010 or alias 9020 in the particular processing template 224, a location is determined for the specific keyword in the digitized data. Data analyzer 114 may search through digitized accounting source document 102 for the identifier 9010 or alias 9020, and return a cell location in the tabulated document. For example, data analyzer 114 may search the tabulated document of FIG. 2 for the text "Invoice Number" and "Invoice #". This query would return that the text "Invoice #" appears in the first column and sixth row of the tabulated document.

At step S1706, based on the particular processing template 224, the data at a location relative to the keyword location is retrieved. The relative location to the identified keyword location as determined at step S1704 may be dictated in the particular processing template 224. For example, the specific processing template would dictate that the value for the specific invoice number was at relative location information indicative of the data information in the next column of the queried keyword location. Accordingly, the value for invoice number would be determined to be "A123". This value may be stored in a memory such as memory 118.

The steps of S1702 through S1706 may be repeated for all values in the processing template 224. Once completed, data processor may modify the accounting database 104 at step S1708 based on the values as processed and extracted. Data processor may create a new entry into the accounting database, or modify a pre-existing one. According to embodiments where the accounting database 104 may be stored on a different computer, data processor 110 may communicate via a network the appropriate modification necessary to the accounting database 104.

According to some embodiments, prior to recording the data in the accounting database, the data may be verified for completeness and accuracy. The data associated with the mandatory fields and other fields related to the mandatory fields may be verified based on internal logical relationships among the digitized data (or accounting items), or based on one or more pre-defined verification rules. The items to be verified for each document may comprise invoice number, invoice date, UOM, quantity, subtotal amount, total amount, etc. For instance, data analyzer 114 may identify, based on the location 9030 (FIG. 10A), if the data associated with the mandatory field "Invoice Number" can be extracted and is reasonable. In the case that the data cannot be extracted or isn't reasonable, the data analyzer 114 may produce a warning or an error message indicating that the data extracted is incomplete and the processing template may be adjusted or the related accounting source document may be reviewed. Also, for example, data analyzer 114 may compute a calculation based on the extracted data to determine if the extracted total matches the calculated total, which may be the sum of subtotal of products purchased and the tax amount, even if the item tax may not be a mandatory field in a particular processing template. If the calculated and extracted values do not match, the data analyzer 114 may produce a warning or an error message after verifying the completeness or accuracy of the extracted data. As another example, the data analyzer 114 may analyze to ensure that no extracted "month" values in digitized accounting source document 102 exceed a value of "12".

According to some embodiments, a report may be generated for human review of imported data. The report may demonstrate the total number of documents parsed at one time, the number of documents passing the verification, and the number of documents failing the verification with reasons. While the failed data will not be recorded, the passed data may be reviewed for approval and then recorded in the accounting database 104.

FIG. 16 is an example entry in a record in accounting database 104. The database entry is populated with example data for illustrative purposes. As can be seen, the data in FIG. 16 corresponds to the digitized accounting source document 102 as shown in FIG. 2. The data processor 110 will generate an entry into the accounting database 104 for each accounting source document in digitized accounting source document 102 received that has an entity and template in entity database 210 and template library 220 respectively.

Figure 17:
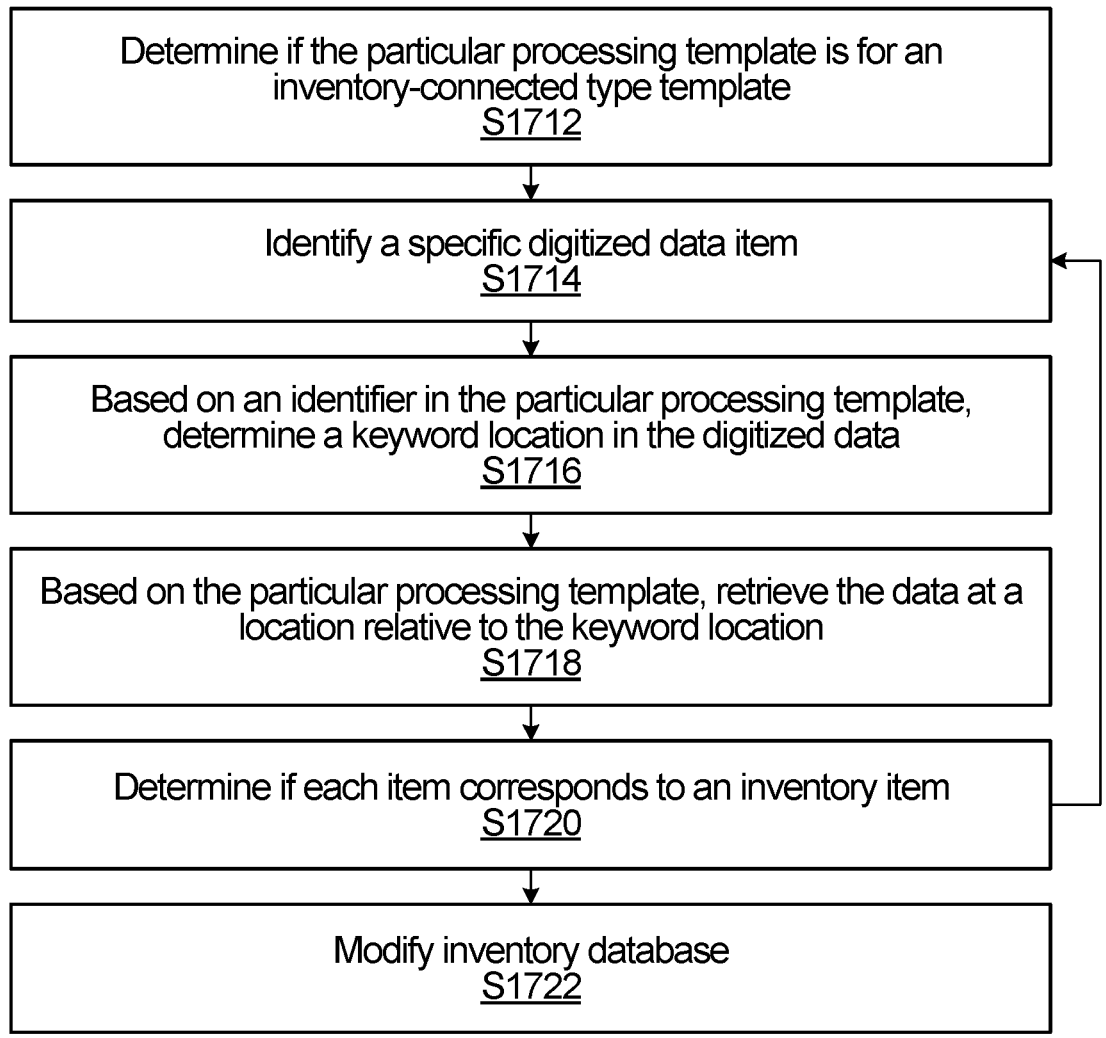
FIG. 17 is a flowchart illustrating a method of processing digitized data based on a template for inventory.

FIG. 17 is a method of processing the digitized data to generate processed data according to the particular processing template, according to another embodiment. According to some embodiments, an inventory database 106 may further be connected to data processor 110. The inventory database 106 may include specifics about products a user has purchased and kept in an inventory. Further, a processing template may be given a template type 222 reflective of whether or not the template is related to an inventory database 106.

If the template type 222 is indicative of an inventory-related digitized accounting source document, processing template 224 may include mandatory fields of Vendor item number, Unit of Measure, and the Quantity (as shown in FIG. 22). The information in those three fields may be used to update an inventory database 106, such as inventory quantity and value, in an accounting system. The parsing method using Inventory Purchase Template is very similar to the parsing method using General Operating Expense & Other Asset Purchase Template as described in relation to FIG. 15.

At step S1712, data analyzer 114 determines if the particular processing template 224 is for an inventory-connected type template. This may be done by querying template library 220 to determine a template type 222 for the processing template 224.

At step S1714, a specific digitized data item is selected. This is done by data analyzer 114 selecting a specific item from the processing template 224. For example, a first item to search for in an invoice may be an invoice number.

At step S1716, based on an identifier 9010 or alias 9020 dictated in the particular processing template 224, a location is determined for the specific keyword in the digitized data. Data analyzer 114 may search through digitized accounting source document 102 for the identifier 9010 or alias text 9020, and return a cell location in the digitized data. For example, data analyzer 114 may search the digitized accounting source document 102 of FIG. 2 for the text "Invoice Number" and "Invoice #". This query would return that the text "Invoice #" appears in the first column and sixth row of the digitized data.

At step S1718, based on the particular processing template 224, the data at a location relative to the keyword location is retrieved. The relative location to the identified keyword location as determined at step S1716 may be dictated by the particular processing template 224. For example, the specific processing template would dictate that the value for the specific invoice number was to the right of the queried keyword location. Accordingly, the value for Invoice number would be determined to be "A123". This value may be stored in a memory such as memory 118.

Once completed, data analyzer 114 will determine if the item corresponds to an inventory item. If the item corresponds to an inventory item, data analyzer 114 may additionally verify the existence of the item in the inventory database 106. Further, data analyzer 114 determines the inventory quantity based on the unit of measure (UOM) ratio for the specific inventory item if the UOM ratio exists. Typically, the product number and unit of measure on a vendor invoice may be different. For example, a retailer may purchase from a vendor a single pallet and sell individual cases of a product. Therefore, the relationships of product number and the ratio of UOM between inventory item and the related vendor product are determined, and the inventory database 106 is updated according to a UOM ratio. The specific values for a UOM ratio may be predefined or created and maintained using a user interface.

The steps of S1714 through S1720 may be repeated for all values in the processing template 224.

Once all necessary items in the digitized data have been recognized, at step S1722 the extracted accounting data will be recorded in an inventory database 106, including the quantity and value, which will be updated based on the ratio of UOM. If the inventory product or UOM cannot be found, a warning message or log entry may be created for user follow-up.

FIG. 18 shows example entries in a record in the inventory database 106 based on the invoice as shown in FIG. 2 (if the invoice is defined and processed as an inventory invoice by a user). As can be seen, each product having a unique stock keeping unit (SKU) may be assigned an inventory ID based on a predefined relationship. Further, based on the UOM ratio, the quantity of a product in an accounting source document may be different from the related product quantity recorded for an inventory purpose in the inventory database 106.

Figure 19:
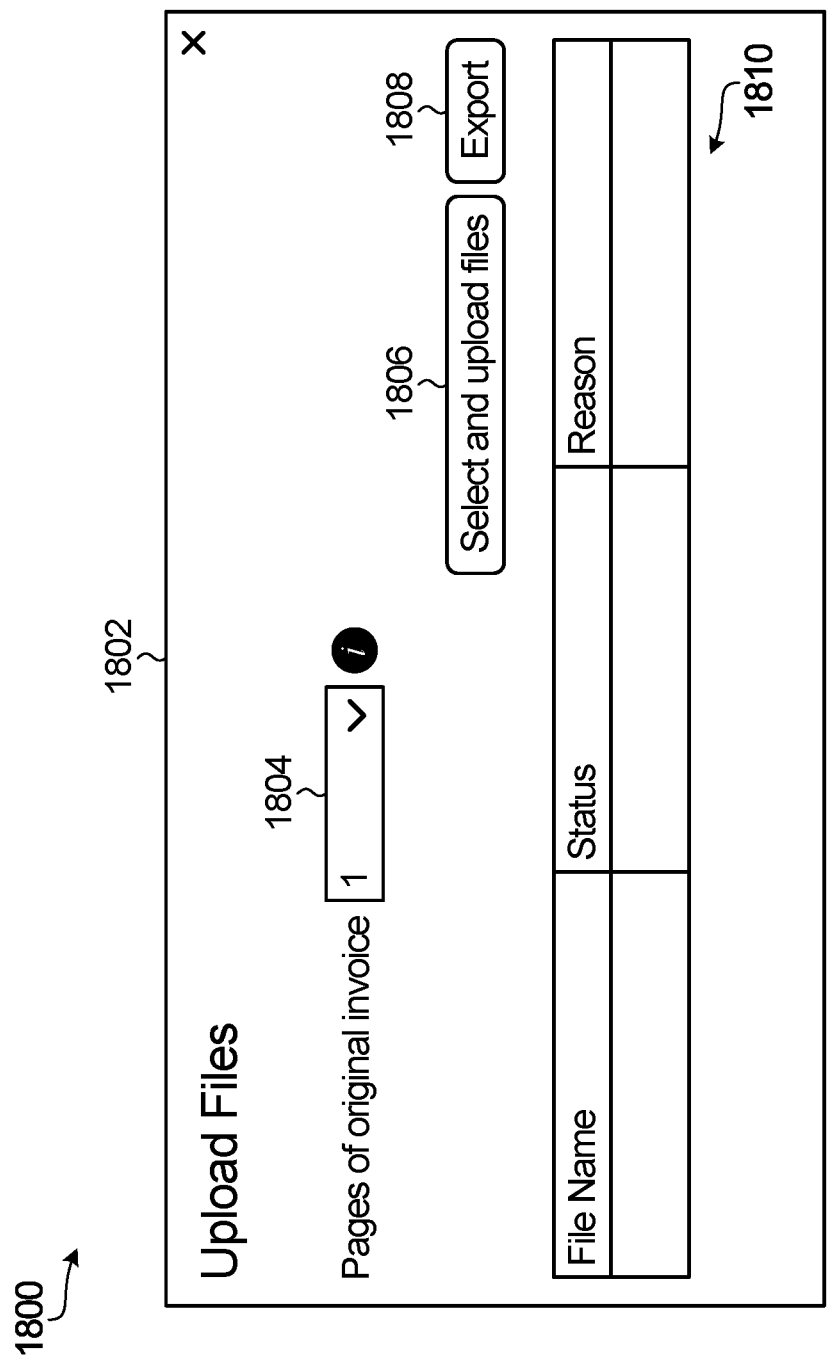
FIG. 19 is a screenshot of an example graphic user interface for providing digitized data to the data processor.

FIG. 19 is an example graphic user interface 1800 that may be presented to a user on display 132 for providing digitized accounting source documents to data processor 110. According to some embodiments, digitized accounting source documents may be uploaded via a web portal 1802. The web portal 1802 may have a page number field 1804, an upload control 1806, an export control 1808, and a table 1810 showing current uploads. A user may select, using page number field 1804, the number of pages corresponding to the digitized accounting source document or other data stored in digitized accounting source document 102. In operation, a user will click on upload control 1806 to select a specific document on a computer or in a network location containing digitized accounting source document 102. Once a user selects a document location, the document will be provided to the data processor 110 for analysis.

According to some embodiments, the files may be uploaded to a remote server. The files stored in the remote server may be displayed in table 1810 showing current uploads. If the user wishes to retrieve a currently uploaded set of digitized accounting source document 102, they may do so using the export button 1808. The export button may be used to download the digitized accounting source document 102 from the server to the computer visiting the web portal 1802.

Figure 20:
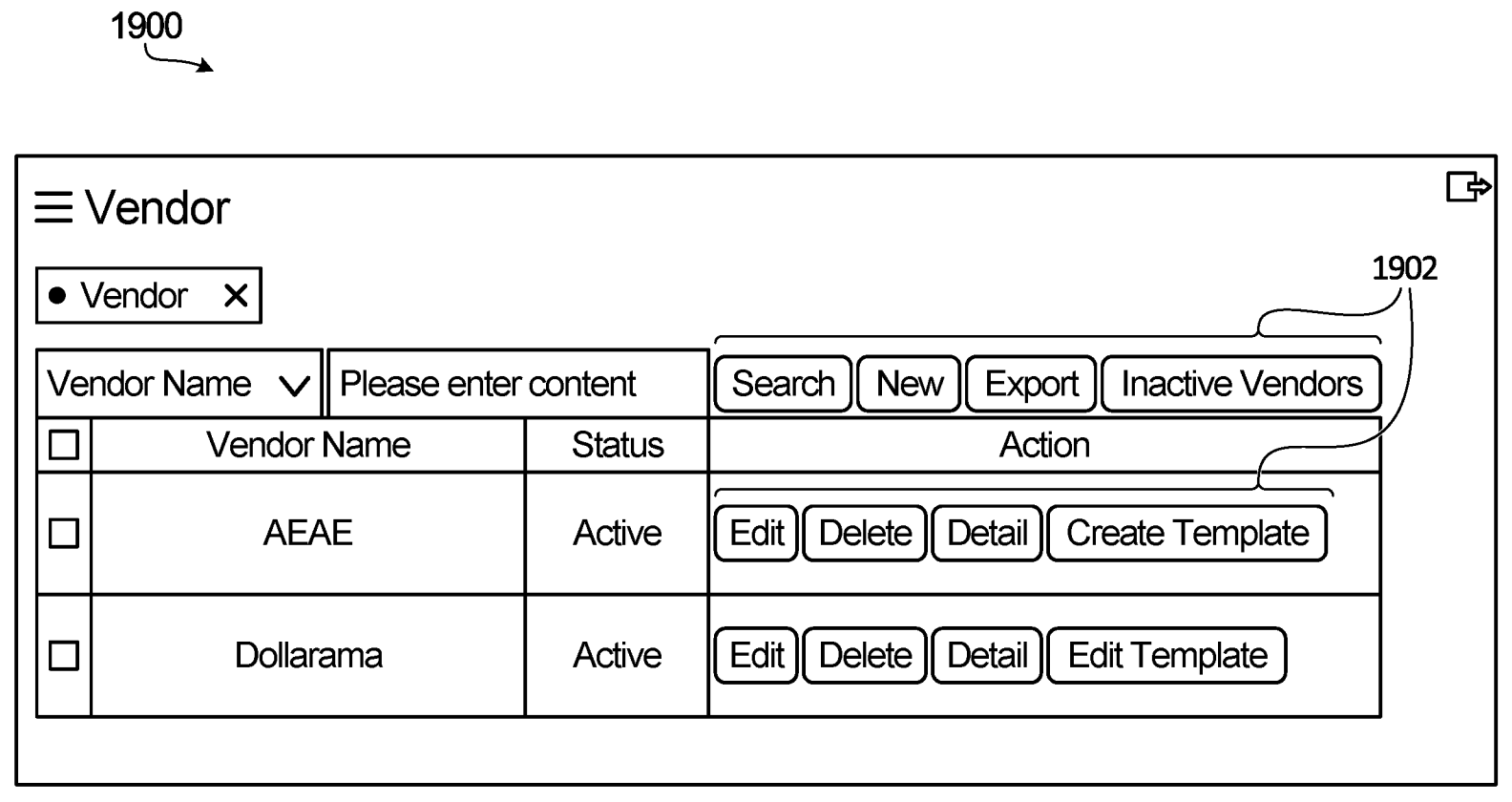

FIG. 20 is an example graphic user interface 1900 that may be presented to a user on display 132 for managing entity database 210. Using controls 1902, a user may create new entries or modify pre-existing entries in entity database 210. A user may also import and export documents to further populate or share values in an entity database 210.

If a user selects control 1902 to enter a new value into entity database 210, they may enter values into entity database 210 using a graphic user interface 2100 as illustrated in FIG. 21. The fields for entry in graphic user interface 2100 may correspond to the values stored for each entity ID 214 in entity database 210. The user interface may have mandatory and optional fields.

FIG. 22 illustrates an example user interface 2200 that may be presented to a user on display 132 for management of a new entry into template library 220. A user will interact with an electronic device, using control 2202 to select the option of generating a processing template from a base template or another processing template. Control 2204 may be employed to select a specific template type 222 for the processing template 224. User interface 2200 includes visual representations of fields for the user to populate corresponding to the identifiers 9010, aliases 9020, and relative locations 9030 that will be recorded for the processing template 224.

According to some embodiments, as shown in FIG. 23 a separate window 2400 may be used to select the relative location 9030 for a specific identifier 9010. Based on the selected relative cell 2402, a relative location 9030 may be determined to be used from the processing template 224 represented and illustrated in FIG. 10A.

FIG. 24 illustrates an example user interface 2500 that may be presented to a user on display 132 for managing an inventory database 106. The user interface includes controls 2502 for adding new entries into the inventory database 106 and editing pre-existing entries. The inventory database 106 may include internal inventory numbers and descriptions, alongside the corresponding vendor product numbers and names.

Using controls 2502 to add a new inventory number, a window 2600, as shown in FIG. 25, may be presented to the user to add a new value into inventory database 106. The window 2600 may include fields 2602 for item number, a description, UOM ratio, etc. According to some embodiments, the UOM ratio may be set by a user and used by data analyzer 114 for converting the quantity of items and updating the inventory database.

As now can be appreciated, some embodiments disclosed herein provide an accurate and robust automatic accounting source document parsing and extracting process and system with minimal human involvement. According to some embodiments, a system as described herein can process a large number of digitized accounting source documents in one run, automatically parsing the documents and extracting accounting-related data therefrom, and presenting the parsed results on a web-based user interface.

In an example embodiment, a system described herein may include uploading digitized accounting source documents with variation in the number of pages for each accounting source document, and generating a new tabulated document for each accounting source document. The system then determines the vendor name in each new document, selecting a processing template based on the vendor name, and parsing and extracting necessary data from the new document based on the selected processing template, verifying the accuracy and completeness of the extracted data, and recording the extracted data in the accounting system.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions, and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor-readable storage medium or media for storage of information, such as computer/processor-readable instructions, data structures, program modules, and/or other data. A non-exhaustive list of examples of non-transitory computer/processor-readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, memory, such as random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor-readable storage media.

The invention claimed is:

1. A computer-assisted method of generating data for populating or updating accounting databases based on digitized accounting source documents, the method comprising, at a processor:
   providing access to an entity database comprising identifiers of entities associated with an accounting database;
   providing access to a digital template library comprising a plurality of processing templates for processing digitized accounting source documents, wherein each one of the entities in the entity database is associated with one of the processing templates;
   receiving digitized data representing a digitized accounting source document;
   determining if the digitized data comprises an entity identifier that matches a particular identifier of a particular entity in the entity database; and
   in response to determining that the entity identifier matches the particular identifier of the particular entity in the entity database,
      retrieving from the template library a particular processing template associated with the particular entity; and
      processing the digitized data to generate processed data, according to the particular processing template, for populating or updating the accounting database based on the processed data,
   wherein the accounting database comprises an inventory database and a non-inventory database, and the template library comprises a first set of processing templates for processing an inventory type of digitized accounting source documents and a second set of processing templates for processing a non-inventory type of digitized accounting source documents.

2. The method of claim 1, wherein the determining comprises:
   parsing the digitized data to locate a text string matching a keyword from a list of pre-defined keywords; and
   parsing text or numerical strings located adjacent to the text string matching the keyword to identify the entity identifier.

3. The method of claim 1, wherein the determining comprises:
   (a) parsing the digitized data to identify a tax number as the entity identifier;
   (b) parsing the digitized data to identify a business name as the entity identifier;
   (c) parsing the digitized data to identify a uniform resource locator as the entity identifier; or
   (d) selecting a record from the entity database,
      (i) searching the digitized data for presence of a phone number matching a phone number from the selected record, and
      (ii) if a matching phone number is present in the digitized data, identifying the entity associated with the selected record as the particular entity, otherwise iteratively selecting another record from the entity database and repeating (i) and (ii).

4. The method of claim 1, wherein the particular processing template comprises format and content information indicative of a format and possible content in original accounting source documents issued by the particular entity.

5. The method of claim 4, wherein the particular processing template defines an alias for a standard keyword, and wherein the processing comprises parsing the digitized data to locate the alias in the digitized accounting source document.

6. The method of claim 4, wherein the particular processing template comprises relative location information for locating data information associated with a specific keyword or an alias thereof, wherein the processing comprises locating the data information associated with the specific keyword or the alias thereof in the digitized accounting source document based on the location of the specific keyword or the alias thereof and the relative location information.

7. The method of claim 4, wherein the digitized accounting source document lists one or more lines of product, each line of product comprising a product identifier and an associated cost, and the particular processing template comprises a specific phrase for locating the first line in the one or more lines of product, and wherein the processing comprises:
   parsing the digitized data to locate the line containing the specific phrase in the digitized accounting source document,
   locating, based on the location of the line containing the specific phrase, the first line, and
   parsing, line-by-line, starting from the first line, the one or more lines of product to obtain the product identifier and associated cost in each line of product.

8. The method of claim 4, wherein the particular processing template is generated based on a base template, the base template defining a plurality of fields to be populated in the accounting database.

9. The method of claim 8, wherein the particular processing template is modified from the base template based on user input.

10. The method of claim 4, wherein the particular processing template is generated based on another processing template and modified based on user input.

11. The method of claim 8, wherein the plurality of fields comprise mandatory fields, and the method further comprising automatically verifying values in the processed data for completeness and accuracy, based on an internal relationship among the digitized data, or based on one or more pre-defined verification rules.

12. The method of claim 1, wherein each one of the first set of processing templates comprises information for identifying an inventory item and a unit of measure of the inventory item in the digitized data and instruction for determining a quantity of units of the inventory item indicated in the digitized accounting source document.

13. The method of claim 1, wherein the digitized data is generated from a digitized document, wherein the digitized document comprises a plurality of ordered data structures representing multiple original accounting source documents, each original accounting source document represented by a pre-defined number of adjacent data structures in the ordered data structures, wherein generation of the digitized data comprises merging the pre-defined number of adjacent data structures in the digitized document to produce a single data structure representing the each original accounting source document.

14. The method of claim 13, wherein the digitized document is a tabulated document, and the ordered data structures are tabs in the tabulated document, each one of the tabs representing a single page in one of the multiple original accounting source documents.

15. The method of claim 13, wherein the digitized document has a document name and the pre-defined number is based on an upload parameter.

16. The method of claim 13, wherein the single data structure is stored as a single tab in a saved tabulated document, or as a separate single document.

17. The method of claim 1, comprising populating or updating the accounting database using the processed data.

18. A computer system comprising:
   a processor; and
   a processor-readable medium storing thereon processor executable instructions that when executed by the processor adapt the processor to perform the method of claim 1,
   the accounting database,
   the entity database, and
   the template library.

19. A computer readable medium storing thereon processor executable instructions that when executed by a processor perform the method of claim 1.

* * * * *